(12) United States Patent
Takeda et al.

(10) Patent No.: US 11,032,041 B2
(45) Date of Patent: Jun. 8, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Kazuaki Takeda, Tokyo (JP); Satoshi Nagata, Tokyo (JP); Katsutoshi Kusume, Munich (DE)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/345,614

(22) PCT Filed: Oct. 25, 2017

(86) PCT No.: PCT/JP2017/038419
§ 371 (c)(1),
(2) Date: Apr. 26, 2019

(87) PCT Pub. No.: WO2018/079572
PCT Pub. Date: May 3, 2018

(65) Prior Publication Data
US 2019/0273587 A1    Sep. 5, 2019

(30) Foreign Application Priority Data

Oct. 28, 2016   (JP) .............................. JP2016-212066

(51) Int. Cl.
*H04W 72/04*   (2009.01)
*H04W 72/10*   (2009.01)
(Continued)

(52) U.S. Cl.
CPC ............ *H04L 5/0035* (2013.01); *H04L 5/001* (2013.01); *H04L 5/0064* (2013.01); *H04W 72/04* (2013.01);
(Continued)

(58) Field of Classification Search
CPC ............................ H04L 5/0035; H04W 72/04
See application file for complete search history.

(56) References Cited

U.S. PATENT DOCUMENTS

2010/0008310 A1    1/2010   Gerstenberger et al.
2011/0090809 A1    4/2011   Chen et al.
(Continued)

FOREIGN PATENT DOCUMENTS

JP    201667019 A    4/2016

OTHER PUBLICATIONS

Extended European Search Report issued in Application No. 17864760. 8, dated May 20, 2020 (9 pages).
(Continued)

*Primary Examiner* — Angel T Brockman
(74) *Attorney, Agent, or Firm* — Osha Bergman Watanabe & Burton LLP

(57) ABSTRACT

To suitably perform communication using a new control unit, even in the case of using the new control unit comprised of the number of subcarriers different from that of the existing resource block, a user terminal according to one aspect of the present invention is characterized by having a receiving section that receives information on a first resource unit comprised of subcarriers lower in number than a predetermined number, and a control section which identifies a frequency region of a second resource unit comprised of the same number of subcarriers as the predetermined number based on the information, and controls communication using the first resource unit inside the frequency region.

8 Claims, 15 Drawing Sheets

(51) Int. Cl.
 *H04L 5/00* (2006.01)
 *H04W 72/12* (2009.01)
(52) U.S. Cl.
 CPC ....... *H04W 72/0453* (2013.01); *H04W 72/10* (2013.01); *H04W 72/1263* (2013.01)

(56) References Cited

U.S. PATENT DOCUMENTS

| 2011/0182377 | A1* | 7/2011 | Fujii | H04L 5/0032 |
| | | | | 375/267 |
| 2015/0139118 | A1* | 5/2015 | Azizi | H04W 74/04 |
| | | | | 370/329 |

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Convida Wireless; "Discussion on Sync Signal Design for NR"; 3GPP TSG RAN WG1 Meeting #86bis R1-1610371; Lisbon, Portugal, Oct. 10-14, 2016 (4 pages).

ASUSTek; "Impact of multiplexing multiple numerologies on initial access"; 3GPP TSG RAN WG1 Meeting #86bis R1-1610204; Lisbon, Portugal, Oct. 10-14, 2016 (3 pages).

Panasonic; "NR synchronization signal and DL broadcast signal"; 3GPP TSG RAN WG1 Meeting #86bis R1-1609701; Lisbon, Portugal, Oct. 10-14, 2016 (4 pages).

Intel Corporation; "NR physical resource block definition"; 3GPP TSG RAN WG1 Meeting #86bis R1-1609506; Lisbon, Portugal, Oct. 10-14, 2016 (4 pages).

International Search Report issued for PCT/JP2017/038419, dated Jan. 16, 2018 (5 pages).

Written Opinion issued for PCT/JP2017/038419, dated Jan. 16, 2018 (4 pages).

* cited by examiner

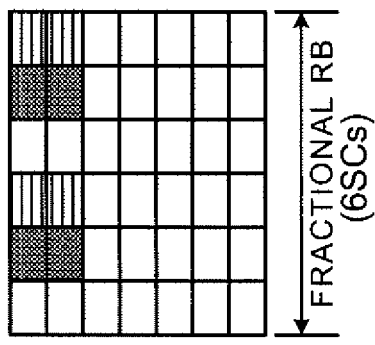
FIG.4C
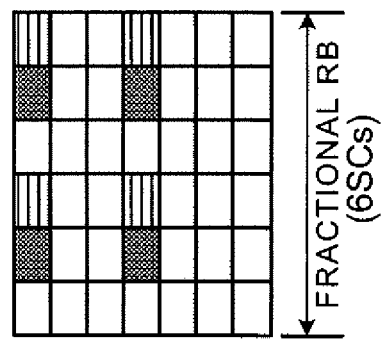
FIG. 4E
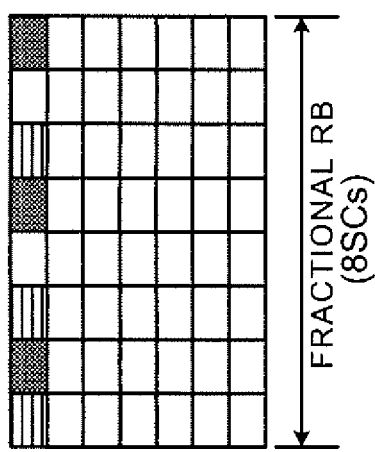
FIG. 4B
FIG. 4D
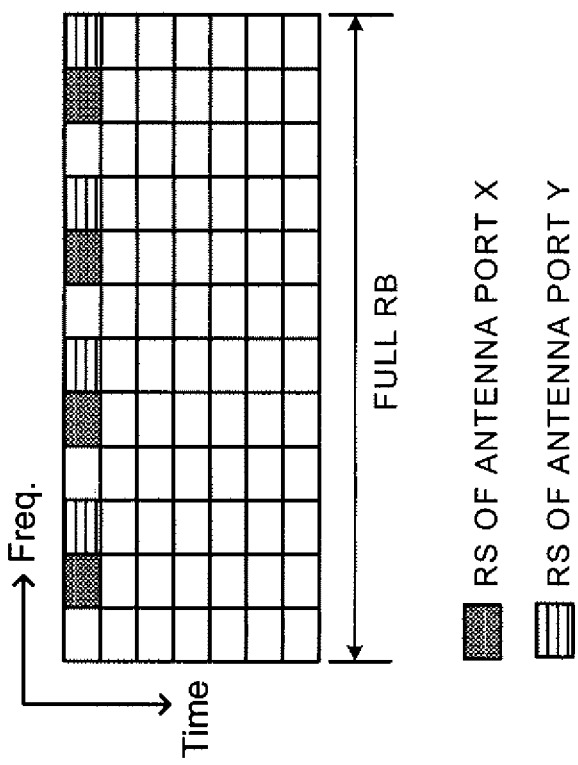
FIG.4A

US 11,032,041 B2

USER TERMINAL AND RADIO COMMUNICATION METHOD

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE (also referred to as LTE Rel. 8 or 9), LTE-A (LTE-Advanced, also referred to as LTE Rel. 10, 11 or 12) has been specified, and successor systems (e.g., also referred to as FRA (Future Radio Access), 5G (5th generation mobile communication system), 5G+ (plus), NR (New Radio), NX (New radio access), New RAT (Radio Access Technology), FX (Future generation radio access), LTE Rel. 13, 14 or 15 onward, etc.) to LTE have been studied.

In LTE Rel. 10/11, in order to widen the band, introduced is Carrier Aggregation (CA) for aggregating a plurality of component carriers (CC: Component Carrier). Each CC is configured with a system band of LTE Rel. 8 as one unit. Further, in CA, a plurality of CCs of the same radio base station (called eNB (eNodeB), Base Station (BS), etc.) is configured for a user terminal (UE: User Equipment).

On the other hand, in LTE Rel. 12, Dual Connectivity (DC) is also introduced where a plurality of cell groups (CG: Cell Group) of different radio base stations is configured for a UE. Each cell group is comprised of at least a single cell (CC). In DC, since a plurality of CCs of different radio base stations is aggregated, DC is also called inter-base station CA (Inter-eNB CA) and the like.

Further, in LTE Rel 8-12, introduced is Frequency Division Duplex (FDD) for performing downlink (DL) transmission and uplink (UL) transmission in different frequency bands, and Time Division Duplex (TDD) for switching between downlink transmission and uplink transmission temporally in the same frequency band to perform.

Furthermore, in LTE Rel. 8-12, retransmission control of data is used based on HARQ (Hybrid Automatic Repeat reQuest). The UE and/or the base station receives receipt confirmation information (also referred to as HARQ-ACK, ACK/NACK, etc.) on transmitted data, and based on the information, determines retransmission of the data.

CITATION LIST

Non Patent Literature

[Non-patent Document 1] 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

SUMMARY OF INVENTION

Technical Problem

In future radio communication systems (e.g., 5G, NR), it is expected to actualize various radio communication services so as to meet respective different requirements (e.g., ultra-high speed, high capacity, ultra-low delay, etc.).

For example, in 5G/NR, it is studied to offer radio communication services called eMBB (enhanced Mobile Broad Band), IoT (Internet of Things), mMTC (massive Machine Type Communication), M2M (Machine to Machine), URLLC (Ultra Reliable and Low Latency Communications) and the like.

In existing LTE, control of scheduling and the like is performed using a radio resource unit called a resource block (RB). On the other hand, in 5G/NR, studied is a fractional RB comprised of the number of subcarriers lower than in the existing RB. However, specific configurations of the fractional RB, resource allocation and the like have not been studied yet. Therefore, unless proper methods are specified, there is the risk that the communication quality, throughput and the like deteriorate.

The present invention was made in view of such a respect, and it is an object of the invention to provide a user terminal and radio communication method capable of suitably performing communication using a new control unit, even in the case of using the new control unit comprised of the number of subcarriers different from that of the existing resource block.

Solution to Problem

A user terminal according to one aspect of the present invention is characterized by having a receiving section that receives information on a first resource unit comprised of subcarriers lower in number than a predetermined number, and a control section which identifies a frequency region of a second resource unit comprised of the same number of subcarriers as the predetermined number based on the information, and controls communication using the first resource unit inside the frequency region.

Advantageous Effects of Invention

According to the present invention, also in the case of using a new control unit comprised of the number of subcarriers different from that of the existing resource block, it is possible to suitably perform communication using the new control unit.

BRIEF DESCRIPTION OF DRAWINGS

FIGS. 4A to 4E are diagrams showing one example of mapping of RS for fractional RB in Embodiment 2.1;

DESCRIPTION OF EMBODIMENTS

In existing LTE, control of scheduling and the like is performed, using a radio resource unit called a resource block (RB). One RB is comprised of resources in a range of 12 subcarriers (=180 kHz) in the frequency domain and 0.5 ms (=7 symbols) in the time domain.

In addition, the resource block may be called a subcarrier group (SCG: Sub-Carrier Group), resource element group (REG), physical resource block (PRB: Physical RB), and the like. Further, a radio resource region comprised of a frequency width of one subcarrier and a period of one OFDM symbol is called a resource element (RE).

In addition, in 5G/NR, it is required to support use of flexible numerology and frequencies to actualize dynamic frame configurations. Herein, the numerology refers to a communication parameter (e.g., at least one of subcarrier spacing (SCS: Subcarrier Spacing), bandwidth, symbol length, cyclic prefix (CP) length, transmission time interval (TTI) length, the number of symbols per TTI, radio frame configuration, filtering processing, windowing processing and the like) about the frequency region and/or the time region.

For example, in NR, it is studied to support a plurality of kinds of numerology to apply respective numerology to different services. For example, it is considered that large SCS is used for URLLC to reduce delay, and that small SCS is used for mMTC to reduce power consumption.

Figure 1:
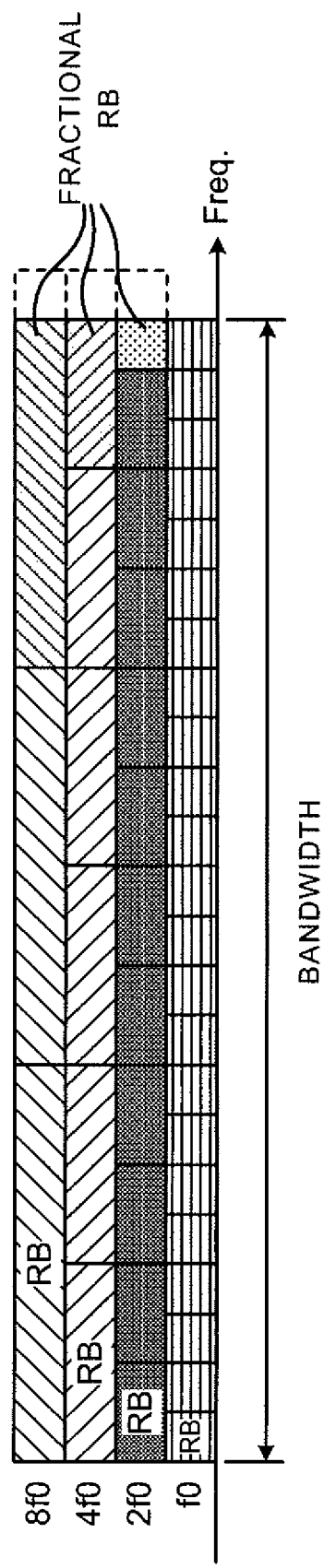
FIG. 1 is a diagram showing one example of using fractional RBs.

In 5G/NR, also in the case of SCS different from SCS(=15 kHz) of existing LTE, it is studied to perform control using the RB (which may called a full RB, ordinary RB and the like) comprised of 12 subcarriers. On the other hand, it is studied to use a fractional RB comprised of the number of subcarriers lower than in the existing RB. Referring to FIG. 1, described are a problem caused by that the size of frequency resources of the RB differs corresponding to a value of SCS, and an effect by introduction of the fractional RB.

FIG. 1 is a diagram showing one example of using the fractional RB. In FIG. 1, a UE is set for a system band with a predetermined width (corresponding to 23 RBs). FIG. 1 illustrates an allocation example of resources in each case where SCS=f0 (e.g., 15 kHz), 2f0, 4f0 or 8f0.

In the case where the SCS is f0, it is possible to allocate radio resources so as to use up the system bandwidth using only full RBs. In the cases except that the SCS is f0, since a frequency region less than the full RB exists, in using only full RBs, it is not possible to allocate radio resources so as to use up the bandwidth. On the other hand, by using also a fractional RB, it is possible to perform allocation to use up the bandwidth.

However, specific configurations of the fractional RB, resource mapping method and the like have not been studied yet. Therefore, unless proper methods are specified, it is not possible to suitably use the fractional RB, and there is the risk that the communication quality, throughput and the like deteriorate. Then, the inventors of the present invention studied techniques for properly using the fractional RB, and found out the invention.

Embodiments according to the present invention will be described below in detail with reference to drawings. A radio communication method according to each Embodiment may be applied alone, or may be applied in combination.

(Radio Communication Method)

Embodiment 1

Embodiment 1 relates to configurations of the fractional RB. The configuration of the fractional RB may be identified by a parameter about the fractional RB (e.g., the number of subcarriers included in the fractional RB, RB index assigned the fractional RB, relative position of the fractional RB occupied inside a predetermined RB, etc.). At least a part of these configurations may be determined differently every numerology. For example, in the case of configuring a plurality of numerology for a UE, the parameter about the fractional RB may be configured for each numerology (e.g., for each SCS).

For example, an RB index assigned a fractional RB may be an index indicative of an RB in a full RB unit, or may be an index indicative of an RB in a fractional RB unit. For example, the UE identifies a full RB based on the RB index, and is capable of controlling communication using the fractional RB inside a frequency region of the full RB.

The number of subcarriers included in a fractional RB is a low value, as compared with the number (e.g., 12) of subcarriers of an ordinary RB, and for example, may be "10", "8", "6" or "3". In addition, in the case where an ordinary RB is comprised of the number of subcarriers higher than "12" in predetermined numerology, the number of subcarriers included in a fractional RB may be "12" or more.

A relative position of a fractional RB occupied inside a predetermined RB may be represented by two values, for example, such that the frequency is high/low (i.e. in drawing as shown in FIG. 2 described later, leftward or rightward) in the RB including the fractional RB, or may be represented by an offset (the number of subcarriers) from a frequency resource where the predetermine RB starts. In addition, as the two values, for example, the value may be expressed by left/right. In this case, "left" may indicate resources on the frequency-lower side, or may indicate resources on the higher side conversely. Further, the offset may be a value for identifying a subcarrier (not vacant) with first resource allocation inside a predetermined RB (or predetermined subband).

Figure 2B:
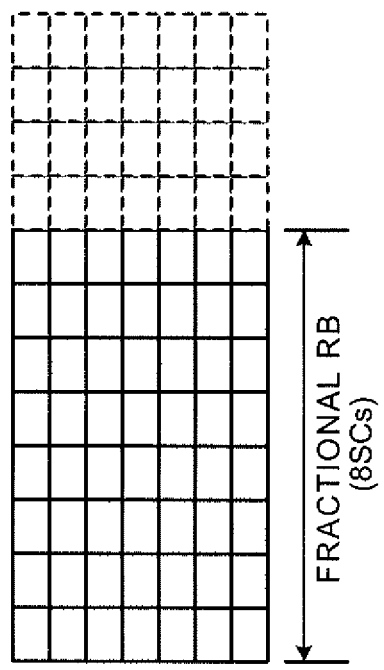
FIGS. 2A to 2C are diagrams showing one example of configurations of the fractional RB.
Figure 2C:
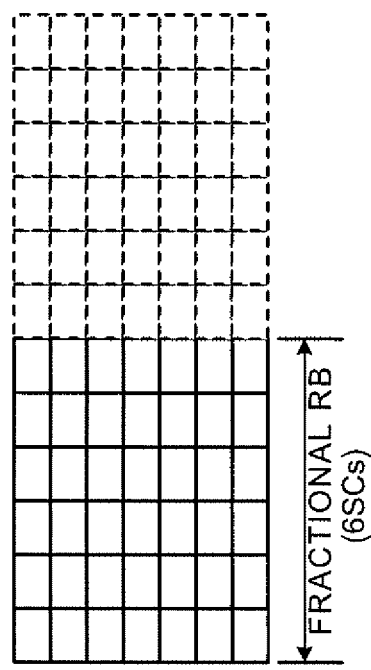
Figure 2A:
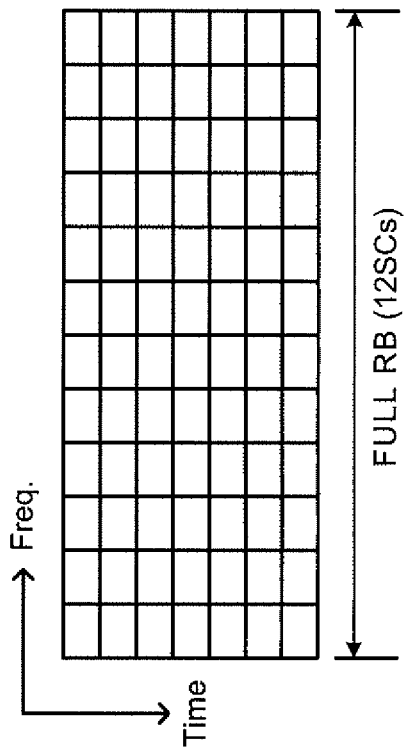

FIG. 2 contains diagrams showing one example of configurations of fractional RBs. FIG. 2A is an example of a full RB, which is comprised of 12 subcarriers×7 symbols. FIGS. 2B and 2C are examples of fractional RBs, which are comprised of 8 subcarriers and 6 subcarriers in a region on the left side (frequency-lower side) in the figure, respectively. In FIG. 2, subcarriers constituting the fractional RB are contiguously allocated.

Herein, resource patterns of the fractional RB are also considered where resources are allocated further in a positive manner. For example, as the pattern, such a pattern may be used that subcarriers are contiguously used up to a predetermined subcarrier position, and that one subcarrier every two subcarriers is used after the position. Such a pattern of mapping every other subcarrier (every second subcarrier) will be described with reference to FIG. 3.

Figure 3A:
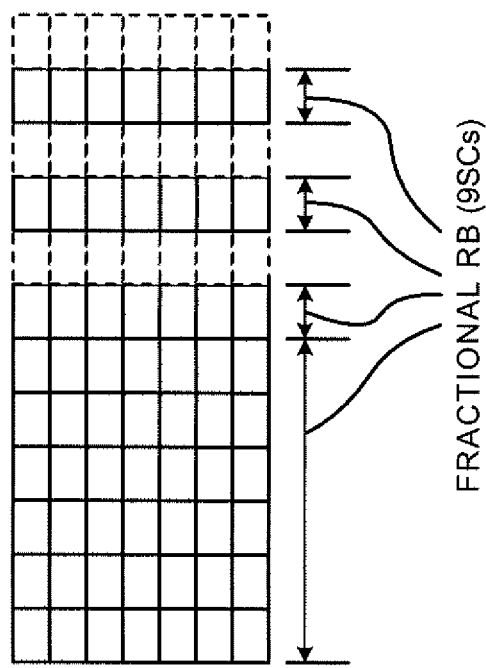
FIGS. 3A and 3B are diagrams showing another example of configurations of the fractional RB.
Figure 3B:
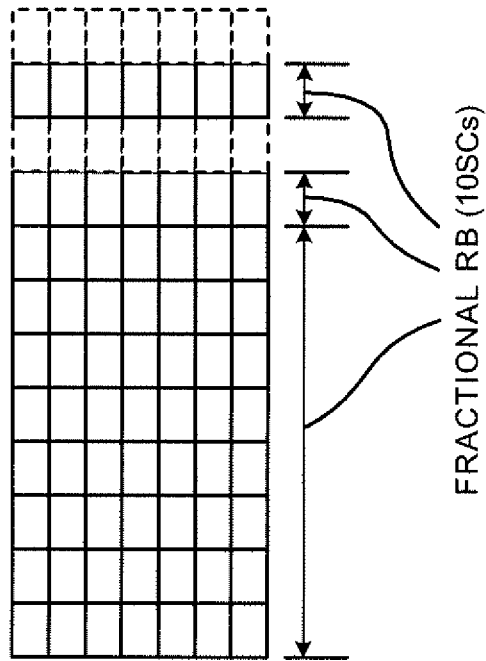

FIG. 3 contains diagrams showing another example of configurations of fractional RBs. FIG. 3A shows an example of the fractional RB of 10 subcarriers, and FIG. 3B shows an example of the fractional RB of 9 subcarriers. In each figure of FIG. 3, a part of subcarriers constituting the fractional RB are allocated to discontiguous (comb-shaped) frequency resources.

Specifically, in FIG. 3A, the above-mentioned predetermined subcarrier position is 8 subcarriers from the left side, and thereafter, every 2 subcarriers, subcarriers on the left side are used as the fractional RB. In FIG. 3B, the above-mentioned predetermined subcarrier position is 6 subcarriers from the left side, and thereafter, every 2 subcarriers, subcarriers on the left side are used as the fractional RB. Subcarriers mapped in the shape of a comb may be subcarriers on the right side every 2 subcarriers.

According to such a fractional RB configuration including discontiguous frequency resources, also in the case of performing Frequency Division Multiplexing (FDM) between different kinds of numerology, it is possible to decrease a guard band. For example, as compared with the SCS (e.g., 15 kHz) of numerology using the fractional RB, in the case where the SCS of numerology undergoing FDM is twice (e.g., 30 kHz), it is possible to regard interference from numerology (adjacent RB) undergoing FDM as zero every other subcarrier.

In addition, opposite sides (high-frequency side and low-frequency side (left side and right side)) of the fractional RB may be discontiguous configurations. Further, all the subcarriers constituting the fractional RB may be disposed discontinuously. For example, the fractional RB may use 6 subcarriers every two subcarriers. In this case, the above-mentioned predetermined subcarrier position may be considered "absence" or "0 subcarrier from the edge". Further, the discontiguous subcarrier arrangement may be arrangements except using one subcarrier every two subcarriers, or may be arrangements for using one subcarrier every n (n>1) subcarriers.

The parameter (information) on the fractional RB may be notified to (configured for) the UE semi-statically. In the case where a semi-statically configured RB is scheduled, the UE may assume (determine) that the RB is the fractional RB. The semi-static notification may be performed by higher layer signaling (e.g., RRC (Radio Resource Control) signaling, broadcast information (master block information (MIB), system information block (SIB), etc.), MAC signaling).

Further, the parameter on the fractional RB may be notified to the UE dynamically. The UE may assume (determine) that one or more RBs among scheduled RBs are the fractional RB, by the notified physical layer signaling (e.g., downlink control information (DCI)).

The parameter on the fractional RB may include information on whether or not the fractional RB includes discontiguous subcarriers in the frequency domain. Further, when the fractional RB includes discontiguous subcarriers in the frequency domain, the parameter on the fractional RB may include the above-mentioned predetermined subcarrier position (information for identifying a subcarrier that is not a guard band) and/or formation on which side (high and/or low, left and/or right, etc.) of the fractional RB is used in discontiguous subcarriers.

In addition, the parameter on the fractional RB may be determined in association with numerology, or may be determined based another indicator. In this case, based on the configured numerology, another indicator and the like, the UE may acquire a parameter on the fractional RB used in a predetermined carrier. For example, another indicator may be a service type (eMBB, URLLC, etc.) of the carrier.

In addition, Embodiment 1 is applicable to configurations of the fractional RB, irrespective of the direction of link (e.g., on both downlink and uplink). The configuration on uplink will further be described in Embodiment 6 described later.

According to Embodiment 1 as described above, the UE and/or the base station is capable of properly determining the configuration of the fractional RB to use.

Embodiment 2

Embodiment 2 relates to resource mapping of a reference signal (hereinafter, also referred to as RS for fractional RB) allocated to a region of the fractional RB. The UE may use the RS for fractional RB in reception processing (demodulation, decoding, etc.) of data and/or control signal transmitted in the fractional RB, or may use in measurement (e.g., RRM (Radio Resource Management) measurement, CSI (Channel State Information) measurement, etc.). Embodiment 2 is further broadly divided into three (Embodiments 2.1-2.3).

Embodiment 2.1

In Embodiment 2.1, the RS for fractional RB is mapped, using a resource mapping method (rule) different from that of RS for full RB. In other words, in the fractional RB, the RS may not be mapped to resources where the RS is mapped in the full RB, or conversely, may be mapped to resources where the RS is not mapped in the full RB. Further, the RS for fractional RB may be mapped to resources a part of which overlap with the RS for full RB.

The predetermined number of RSs assigned to the fractional RB is preferably made the same predetermined number of RSs assigned to the full RB for maintenance of channel estimation accuracy, but may differ (e.g., based on the resource size (the number of resource elements) of the fractional RB with respect to the full RB, the number may be increased or decreased.)

FIG. 4 contains diagrams showing one example of mapping of RS for fractional RB in Embodiment 2.1. FIG. 4A is a comparative example of the full RB, and illustrates resources to which four RSs of each of two antenna ports (antenna ports X, Y) are mapped. In this example, it is assumed that the RS is mapped to a beginning symbol of the full RB, but the present invention is not limited thereto. Further, the number of antenna ports of the RS may also be any number.

FIGS. 4B and 4C are diagrams showing one example of front-loaded RS. The front-loaded RS is transmitted in an earlier stage (e.g., first symbol, second symbol, etc.) in the fractional RB. FIG. 4B illustrates a fractional RB of 8 subcarriers, and FIG. 4C illustrates a fractional RB of 6 subcarriers.

In FIG. 4B, although the number of RBs per port decreases, as in the full RB, the RS is transmitted in the beginning symbol. In FIG. 4C, it is possible to keep the number of RBs per port.

FIGS. 4D and 4E are diagrams showing one example of distributed RS. The distributed RS is transmitted in temporary discontiguous resources in the fractional RB. FIG. 4D illustrates a fractional RB of 8 subcarriers, and FIG. 4E illustrates a fractional RB of 6 subcarriers. In FIGS. 4E and 4E, it is possible to keep the number of RBs per port.

In addition, in the fractional RB including discontiguous frequency resources described in Embodiment 1, the RS for fractional RB may be mapped to the discontiguous frequency resources.

According to Embodiment 2.1, the UE is capable of performing transmission or reception processing within the fractional RB.

Embodiment 2.2

In Embodiment 2.2, the RS for fractional RB is mapped to the same resource as that of the RS for full RB. In other words, in Embodiment 2.2, resources (REs) of the RS for fractional RB are a subset of resources (REs) of the RS for full RB.

Figure 5:
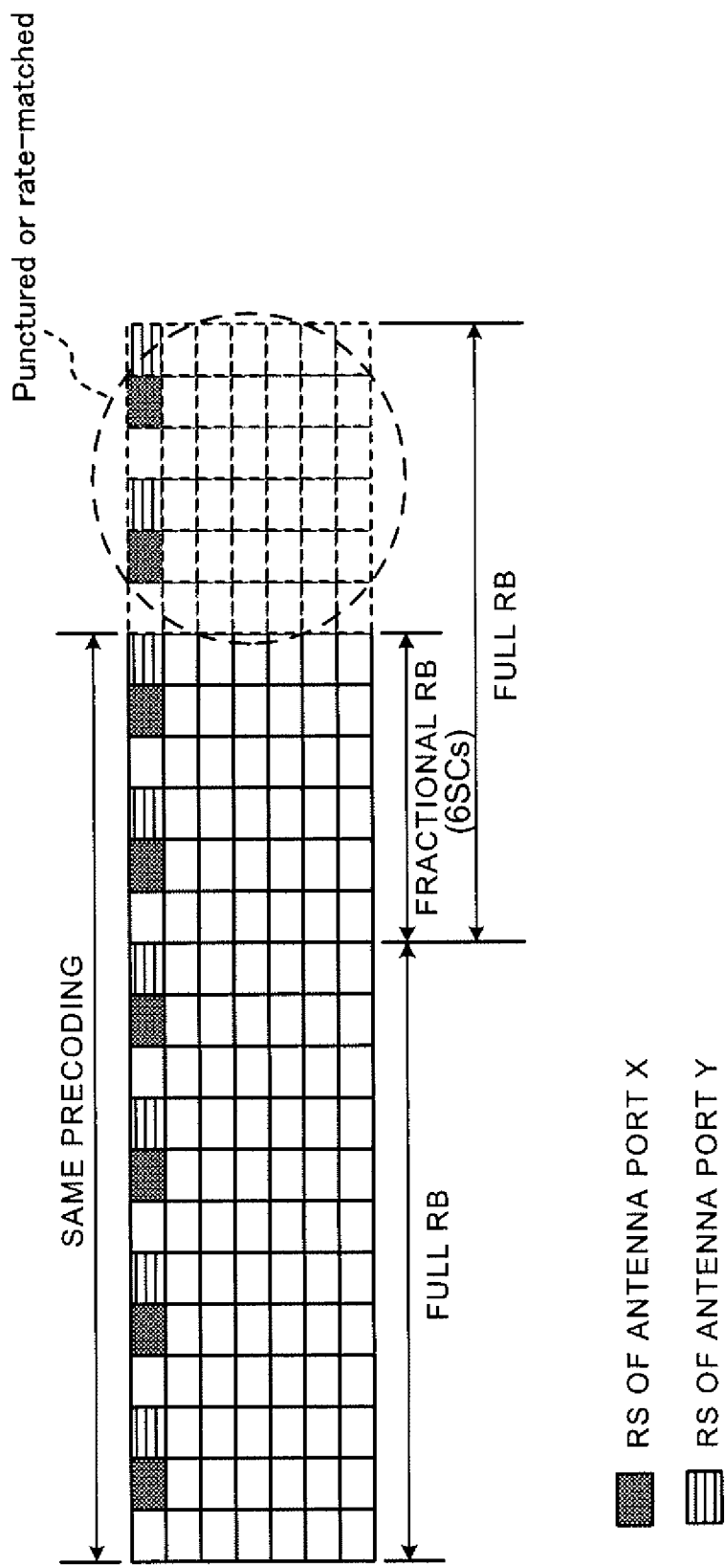
FIG. 5 is a diagram showing one example of mapping of RS for fractional RB in Embodiment 2.2.

FIG. 5 is a diagram showing one example of mapping of RS for fractional RB in Embodiment 2.2. The fractional RB is assumed to have frequency resources of 6 subcarriers, but is not limited thereto. In Embodiment 2.2, in the fractional RB, REs of a signal (data, RS, control signal, etc.) which would be mapped in the full RB are subjected to puncturing or rate matching.

Further, in Embodiment 2.2, the fractional RB is scheduled adjacently to the full RB scheduled independently. Herein, the same precoding as in the adjacent full RB may be applied to the fractional RB. In this case, using the RS of one or both of the fractional RB and the adjacent full RB, the UE is capable of performing reception processing of data included in the fractional RB.

According to Embodiment 2.2, in contrast to the risk that channel estimation accuracy deteriorates in using only the RS included in the fractional RB, by using also the RS of the adjacent full RB, it is possible to suppress deterioration of channel estimation accuracy. Further, since the UE maps the RS according to the same rule in the full RB and the fractional RB, it is possible to suppress increases in processing load.

Embodiment 2.3

In Embodiment 2.3, the RS for fractional RB is not defined. Therefore, in Embodiment 2.3, the fractional RB does not include resources (REs) of the RS.

Figure 6:
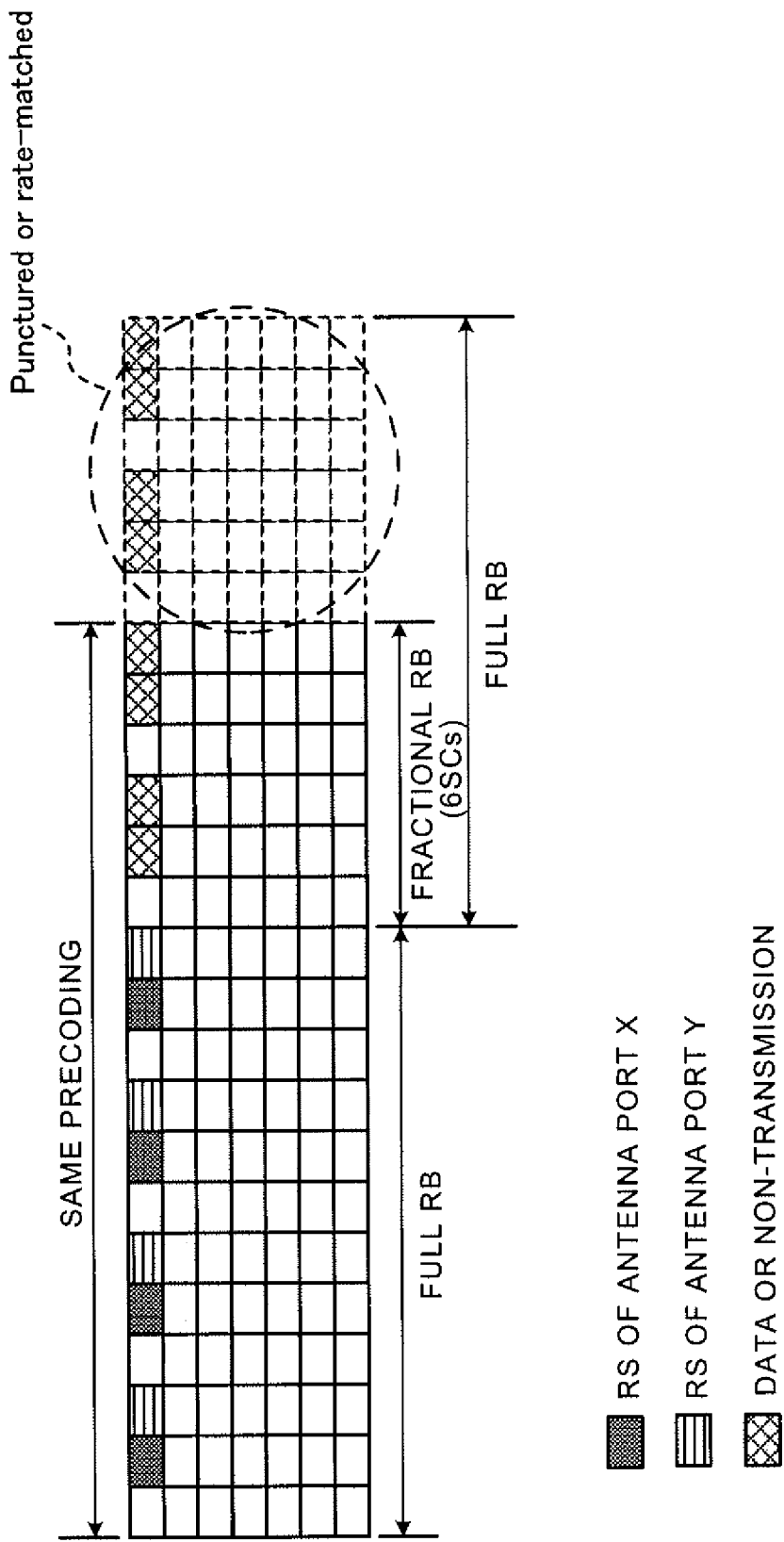
FIG. 6 is a diagram showing one example of mapping of RS for fractional RB in Embodiment 2.3.

FIG. 6 is a diagram showing one example of mapping of RS for fractional RB in Embodiment 2.3. FIG. 6 is almost the same figure as FIG. 5, and differences will mainly be described below.

In Embodiment 2.3, as in Embodiment 2.2, it is preferable that the fractional RB is scheduled adjacently to the full RB scheduled independently, and that the same precoding as in the full RB is applied to the fractional RB. Using the RS of the adjacent full RB, the UE is capable of performing reception processing of data included in the fractional RB.

In the fractional RB, to resources to which the RS would be mapped in the full RB, signals such as a data signal and control signal except the RS may be mapped, or the signal may not be mapped (RE is null, or non-transmission). Further, in the fractional RB, the UE may ignore (may not perform reception processing on) the resources to which the RS would be mapped in the full RB.

According to Embodiment 2.3, it is possible to improve spectral usage efficiency in the fractional RB.

According to Embodiment 2 as described above, using a predetermined reference signal, it is possible to properly perform processing concerning the fractional RB.

Embodiment 3

Embodiment 3 relates to a resource mapping rule of data in the fractional RB. The data mapping method according to Embodiment 3 includes a method (frequency-first and time-second mapping) of first mapping in the frequency domain, and another method (time-first and frequency-second mapping) of first mapping in the time domain. The first method may be called frequency-prior mapping, and the latter method may be called time-prior mapping.

In the case of mapping data using the frequency-prior mapping in a predetermined region, the first data is mapped to an RE of a minimum subcarrier index and a minimum symbol index in the predetermined region. Then, subsequent data is mapped in the direction of increasing the frequency, and when arriving at a maximum frequency in the predetermined region, mapping is shifted to an RE of a minimum subcarrier index of the next symbol to perform similar processing.

The time-prior mapping is equal to a method where the frequency (subcarrier) and time (symbol) in the frequency-prior mapping are replaced with each other. In addition, the subcarrier and/or symbol to start mapping is not limited to the minimum, and may be any RE included in a predetermined RB.

FIG. 7 contains diagrams showing one example of resource mapping patterns of data for a fractional RB in Embodiment 3. FIG. 7 shows the example where data is mapped to one or more full RBs and two fractional RBs adjacent to opposite ends of the full RB (example of scheduling the full RB and fractional RB concurrently (to overlapping time resources)), but the numbers, positions and the like of the full RB and the fractional RB are not limited thereto.

Figure 7B:
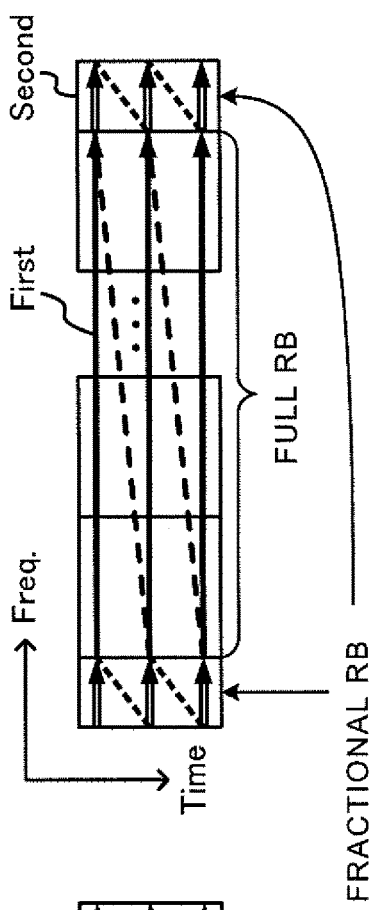
FIGS. 7A to 7D are diagrams showing one example of resource mapping patterns of data for fractional RBs in Embodiment 3.
Figure 7A:
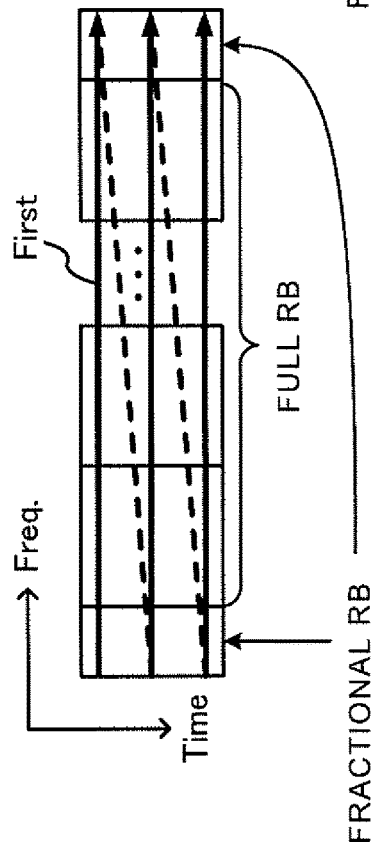

In the case of the frequency-prior mapping, for example, the mapping may be in accordance with a rule as shown in FIG. 7A, or 7B. As shown in FIG. 7A, irrespective of the presence or absence of use of the fractional RB, data may be subjected to the frequency-prior mapping on all allocated full RBs. Further, as shown in FIG. 7B, after performing the frequency-prior mapping on the data in the closed region of the full RB, subsequent data may be subjected to the frequency-prior mapping in the closed region of the fractional RB.

Figure 7D:
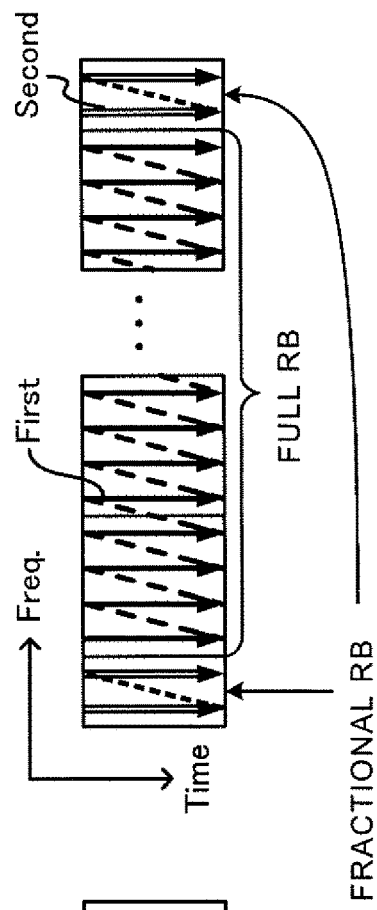
Figure 7C:
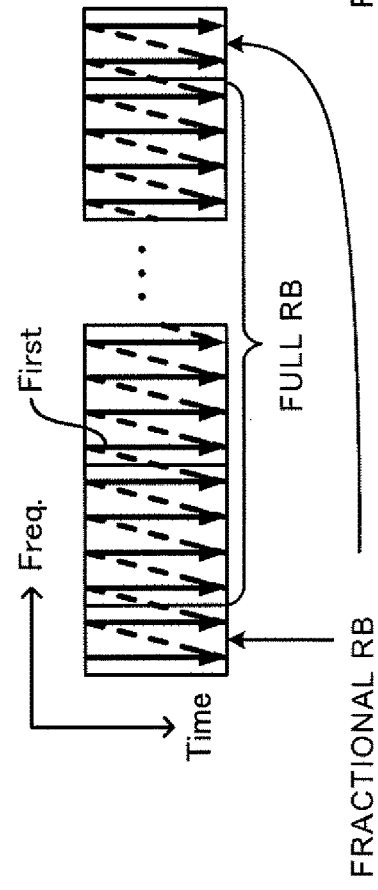

In the case of the time-prior mapping, for example, the mapping may be in accordance with a rule as shown in FIG. 7C, or 7D. As shown in FIG. 7C, irrespective of the presence or absence of use of the fractional RB, data may be subjected to the time-prior mapping on all allocated full RBs. Further, as shown in FIG. 7D, after performing the time-prior mapping on the data in the closed region of the full RB, subsequent data may be subjected to the time-prior mapping in the closed region of the fractional RB.

As shown in FIGS. 7B and 7D, in the case of mapping data to the full RB (first) with lower priority placed on the fractional RB, data transmitted in the fractional RB is positioned on the rear side of soft buffer for retransmission/combining. On the data on the rear side of soft buffer, there is the case where the data is not transmitted or not combined (deleted) in retransmission. Further, the fractional RB is positioned in the end or the like of the predetermined band (e.g., system band), and is expected to undergo interference from a signal of another adjacent numerology (i.e., the reception quality is poor.)

Therefore, by mapping the data first to the full RB, it is possible to store data of the fractional RB where an error tends to occur on the rear side of soft buffer. By this means, it is possible to suppress decreases in HARQ performance of retransmission.

Further, in the case of the mapping methods in FIGS. 7B and 7D, for example, even when at least one of the number of fractional RBs, size and the like changes during retransmission, it is possible to easily apply rate matching.

In addition, in a manner opposite to FIGS. 7B and 7D, data may be mapped to the fractional RB (first) with lower priority placed on the full RB. In other words, after performing the frequency or time-prior mapping on the data in the closed region of the fractional RB, subsequent data may be subjected to the frequency or time-prior mapping in the closed region of the full RB.

In retransmission, the resource mapping pattern to apply may be made different between initial transmission and/or the case of another retransmission (hopping and/or switching may be performed.) For example, even in the case of starting mapping of initial transmission from a predetermined RB (e.g., the leftmost full RB), mapping in retransmission may be started from an RB (e.g., third full RB from the leftmost) displaced from the predetermined RB. By thus mapping, data in retransmission is subjected to cyclic shift in the frequency domain, and it is possible to suppress such a situation that only a part of data is mapped to the end of the band, and continuously undergoes interference.

In using the fractional RB, the UE and/or the radio base station may use chase combining in soft combining of HARQ, or may use IR (Incremental Redundancy). The chase combining is a scheme for transmitting the same parity bit as the parity bit used in initial transmission, in data retransmission. The IR is a scheme for transmitting a parity bit different from the parity bit used in initial transmission, in data retransmission.

In case of receiving a signal including the fractional RB, the UE and/or the base station may assume at least one of mapping methods as described above to perform reception processing. Further, the UE and/or the base station may perform reception processing, based on the mapping method identified by notified information.

According to Embodiment 3 as described above, even in the case where scheduling including the fractional RB is performed, it is possible to properly perform resource mapping of data.

Embodiment 4

Embodiment 4 relates to a modulation scheme and coding rate (MCS: Modulation and Coding Scheme) of data in the fractional RB, and transport block size (TBS). In Embodiment 4, in the case of scheduling data in the fractional RB, the UE and/or the base station determines the TBS of the data, based on the number of resources obtained by converting resources of scheduled fractional RBs in terms of full RB unit.

For example, the TBS of data including the fractional RB may be obtained based on the number of full RBs subsequent to conversion expressed by the following equation 1.

$$\left\lceil M + \sum_{x=0}^{N-1} \frac{n_x}{12} \right\rceil \quad \text{(Equation 1)}$$

Herein, M is the number of scheduled full RBs, N is the number of scheduled fractional RBs, and $n_x$ is the number of subcarriers included in an xth scheduled fractional RB.

In equation 1, the scheduled fractional RBs are integrated with a portion less than the full RB rounded up, and are converted into the number of full RBs. On the other hand, the TBS of data including the fractional RB may be obtained based on the sum (=M+N) of the number of scheduled full RBs and the number of scheduled fractional RBs. In this case, it is possible to obtain the TBS when the number of fractional RBs is determined, and therefore, for example, also in the case where $n_x$ may vary, it is possible to perform consistent control.

Further, the MCS of data in the fractional RB may be calculated based on at least one of the above-mentioned TBS, the value of equation 1 and M+N.

According to Embodiment 4 as described above, even in the case where scheduling including the fractional RB is performed, it is possible to properly perform modulation, coding and the like of data.

Embodiment 5

Embodiment 5 relates to a downlink control channel in using the fractional RB. In Embodiment 5, the downlink control channel is capable of being allocated to only full RBs (Embodiment 5.1), or the downlink control channel is capable of being allocated to both the full RB and the fractional RB (Embodiment 5.2).

FIG. 8 contains diagrams showing one example of resource mapping of downlink control channel candidates in using the fractional RB in Embodiment 5. FIG. 8 shows the example similar to FIG. 7, but the numbers, positions and the like of the full RB and fractional RB are not limited thereto.

Figure 8A:
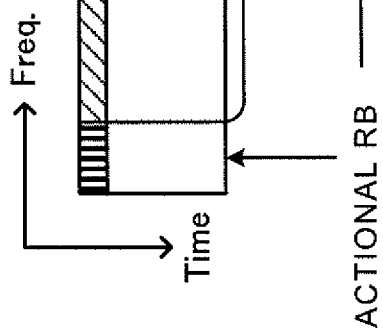
FIGS. 8A and 8B are diagrams showing one example of resource mapping of downlink control channel candidates in using fractional RBs in Embodiment 5.

FIG. 8A corresponds to Embodiment 5.1. The downlink control channel candidates are not included in the fractional RB. Therefore, the UE does not monitor the downlink control channel candidates in a region belonging to the fractional RB, and monitors the downlink control channel candidates only in a region belonging to the full RB.

Figure 8B:
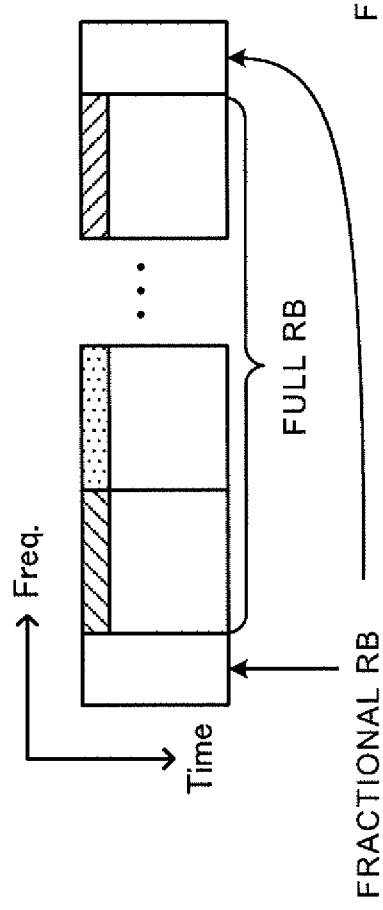

FIG. 8B corresponds to Embodiment 5.2. The downlink control channel candidates may be included in the fractional RB. Therefore, in addition to the region belonging to the full RB, the UE monitors the downlink control channel candidates also in the region belonging to the fractional RB. In this case, the fractional RB may be regarded as a resource unit of the downlink control channel.

According to Embodiment 5 as described above, even in the case where the fractional RB is configured, it is possible to properly acquire downlink control information.

Embodiment 6

Embodiment 6 relates to application of the fractional RB to uplink.

Use of the fractional RB may be limited to only downlink (Embodiment 6.1). In this case, it is possible to suppress complexity of uplink power control, signal processing and the like.

In the case of using the fractional RB on uplink, use of the fractional RB may be limited to a predetermined access scheme for uplink (e.g., Cyclic Prefix OFDM (CP-OFDM: Cyclic Prefix Orthogonal Frequency Division Multiplexing)) (Embodiment 6.2). In this case, when the transmission waveform is another access scheme (e.g., DFT Spread OFDM (DFT-S-OFDM: Discrete Fourier Transform Spread Orthogonal Frequency Division Multiplexing)), the UE may not assume that the fractional RB is scheduled.

In the case of using the fractional RB on uplink, the fractional RB may be used in a plurality of access schemes (e.g., CP-OFDM and DFT-s-OFDM) for uplink. There is the case where particular control with the fractional RB is useful for DFT-s-OFDM.

In addition, the use form of the fractional RB on uplink may be different from the use form of the fractional RB on downlink, or may be the same as that on downlink. For example, the UE may assume that access schemes capable of using the fractional RB are different between uplink and downlink.

According to Embodiment 6 as described above, even in the case where the fractional RB is configured, it is possible to properly perform control of uplink.

Embodiment 7

Embodiment 7 relates to the RS for fractional RB on uplink to transmit in a single-carrier transmission scheme (e.g., DFT-s-OFDM).

An uplink demodulation reference signal (DMRS: DeModulation Reference Signal) in existing LTE uses CAZAC (Constant Amplitude Zero Auto-Correlation) sequences. The sequence length of the CAZAC sequence is defined as a maximum prime number that does not exceed "12", "24", or 12×the number of RBs. Specifically, in the case where an uplink transmission bandwidth is 3 RBs or more, the base sequence of the DMRS in existing LTE is defined as cyclic extension of a ZC (Zadoff-Chu) sequence determined by the maximum prime number that does not exceed 12×the number of RBs.

$$\bar{r}_{u,v}(n) = x_q(n \bmod N_{ZC}^{RS}), 0 \leq n \leq N_{SC}^{RS} - 1 \quad \text{(Equation 2)}$$

$$\text{where } x_q(m) = e^{-j\frac{\pi q m(m+1)}{N_{ZC}^{RS}}}, 0 \leq m \leq N_{ZC}^{RS} - 1 \quad \text{(Equation 3)}$$

Herein, $M_{sc}^{RS}$ is a DMRS sequence length, where $M_{sc}^{RS} = mN_{sc}^{RB}$. m is the number of RBs, and $N_{sc}^{RB}$ is the number of subcarriers (=12) inside the RB. $x_q(m)$ is a qth ZC sequence, and $N_{zc}^{RS}$ is determined by the maximum prime number meeting $N_{zc}^{RS} < M_{sc}^{RS}$ (e.g., the maximum number-1).

Therefore, for example, when the case of transmitting only the fractional RB is considered, the existing DMRS does not have a supported sequence length, and Is not capable of being transmitted. Further, in equations 2 and 3, since it is not distinguished whether the RB is the full RB or the fractional RB, it is expected that using in the sequence of uplink RS is not preferable in the case of configuring the fractional RB. Therefore, the inventors of the present invention found out sequences of uplink RS in the case where the fractional RB is configured with respect to the single-carrier transmission scheme (Embodiment 7.1-7.3).

Embodiments 7.1-7.3 will be described below with reference to FIG. 9. FIG. 9 shows an example where the transmission bandwidth corresponds to a plurality of full RBs and one fractional RB, but is not limited thereto.

Embodiment 7.1

Embodiment 7.1 is to specify new CAZAC sequences shorter or longer than the CAZAC sequence (CAZAC sequence of the existing DMRS) used in the case of only the full RB. For example, the sequence length $N_{zc}^{RS}$ of the sequence may be values less than "12" such as "3", "6", "8" and "10", or may be defined by the maximum prime number that does not exceed $H_{sc}$ in the following equation 4 (i.e., meeting $N_{zc}^{RS} < H_{sc}$.) $H_{sc}$ corresponds to the total number of subcarriers to transmit (an effective signal).

$$H_{SC} = 12M + \sum_{x=0}^{N-1} n_x \quad \text{(Equation 4)}$$

Figures 9A, 9B, 9C:
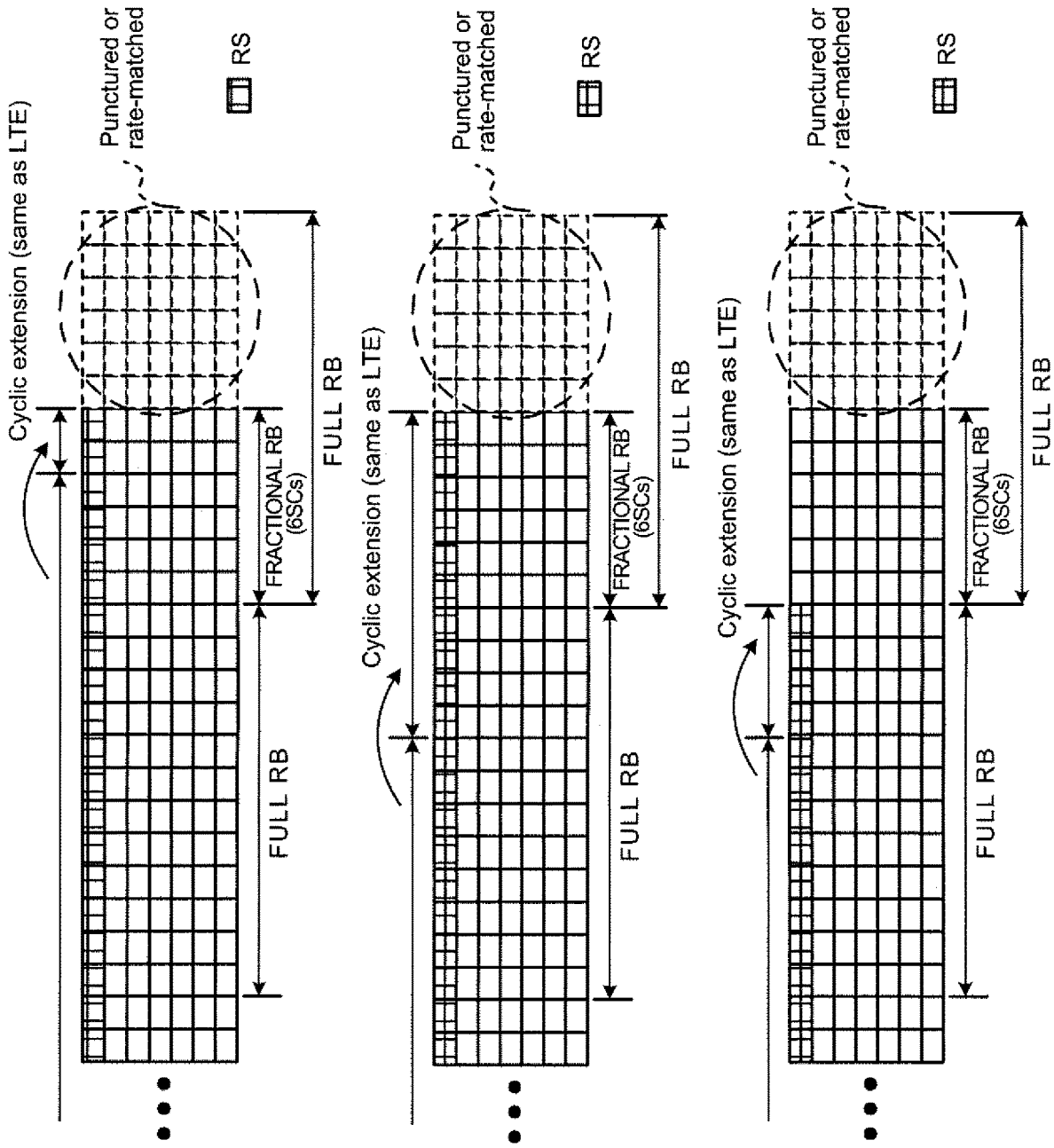
FIGS. 9A to 9C are diagrams showing one example of mapping of uplink RSs in Embodiment 7.

In FIG. 9A, using the CAZAC sequence having the sequence length determined by the maximum prime number that does not exceed $H_{sc}$, RSs are generated up to a fourth subcarrier from the left of the fractional RB shown in the figure. Cyclic extension of the CAZAC sequence is used in RSs of remaining two subcarriers of the fractional RB.

Embodiment 7.2

In Embodiment 7.2, cyclic extension of the CAZAC sequence (CAZAC sequence of the existing DMRS) used in the case of only the full RB is used in RSs of the fractional RB. For example, the sequence length $N_{zc}^{RS}$ of the sequence may be values less than "12" such as "3", "6", "8" and "10", or may be defined by the maximum prime number that does not exceed a predetermined value ($M_{sc}$). Herein, $M_{sc} = 12M$, which corresponds to the total subcarriers of only the full RB. In other words, the sequence length of the CAZAC sequence of Embodiment 7.2 corresponds to the sequence length of the existing CAZAC sequence, in the case of considering only the full RB with the fractional RB ignored.

In FIG. 9B, using the CAZAC sequence having the sequence length determined by the maximum prime number that does not exceed $M_{sc}$, RSs are generated up to an eighth subcarrier from the left of the full RB shown in the figure. Cyclic extension of the CAZAC sequence is used in RSs of remaining four subcarriers of the full RB and the fractional RB.

Embodiment 7.3

In Embodiment 7.3, as described in Embodiment 2.3, the RS for fractional RB is not defined. In other words, in Embodiment 7.3, the RS is not mapped to the fractional RB, and signals (data signal, control signal, etc.) except the RS are mapped. In this case, the RS is mapped to only the full RB, and it is not necessary to consider the RS for fractional RB.

In Embodiment 7.3, the UE may assume that the fractional RB is scheduled adjacently to the full RB. The RS mapped to the full RB is generated from the CAZAC sequence, as though only the full RB is scheduled. The CAZAC sequence may be the CAZAC sequence in existing LTE. For example, the sequence length $N_{zc}^{RS}$ of the sequence may be defined by the maximum prime number that does not exceed $M_{sc}$ described in Embodiment 7.2.

In the fractional RB, a data signal and/or control signal may be mapped to resources to which the RS would be mapped in the full RB, or the signal may not be mapped. Further, the UE may ignore (may not perform reception processing on) resources to which the RS would be mapped in the full RB.

In FIG. 9C, using the CAZAC sequence having the sequence length determined by the maximum prime number that does not exceed $M_{sc}$, RSs are generated up to an eighth subcarrier from the left of the full RB shown in the figure. Cyclic extension of the CAZAC sequence is used in RSs of remaining four subcarriers of the full RB. Further, the RS is not mapped to the fractional RB.

According to Embodiment 7 as described above, it is possible to support the case of needing the sequence length less than "12" in the RS.

Embodiment 8

Embodiment 8 relates to power control of the fractional RB on uplink.

In existing LTE, transmit power $P_{PUSCH,c}(i)$ of a PUSCH (Physical Uplink Shared Channel) in a subframe i of a cell c is capable of being expressed by the following equation 5.

$$P_{PUSCH,c}(i) = \min \begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm] \quad \text{(Equation 5)}$$

Herein, $P_{CMAX,c}(i)$ is maximum transmit power of a UE. $M_{PUSCH,c}(i)$ is a bandwidth (the number of RBs) for a PUSCH allocated to the UE. $P_{O\_PUSCH,c}(j)$ is a parameter (parameter related to a transmit power offset) according to target received power (target received SNR: Signal to Noise Ratio). $\alpha_c(j)$ is a weight coefficient of fractional TPC. $PL_c$ corresponds to pass loth. $\Delta_{TF,c}(i)$ is an offset based on MCS applied to the PUSCH, and $f_c(i)$ is a correction value by TPC command.

In addition, the above-mentioned $P_{CMAX,c}(i)$, $M_{PUSCH,c}(j)$, $P_{O\_PUSCH,c}(j)$, $\alpha_c(j)$, $PL_c$, $\Delta_{TF,c}(i)$ and $f_c(i)$ may be described with at least one of c, i and j omitted, respectively. Further, these values may be used for a plurality of cells and/or a plurality of subframes.

In equation 5, it is not distinguished whether the RB is the full RB or the fractional RB, and therefore, it is expected that use in uplink power control is not preferable in the case where the fractional RB is configured. Therefore, the inventors of the present invention found out uplink power control in the case where the fractional RB is configured. Specifically, in Embodiment 8, $M_{PUSCH}$ of equation 5 is newly defined as a bandwidth with the fractional RB properly considered.

With respect to a PUSCH including the fractional RB, based on the number of resources obtained by converting resources of scheduled fractional RBs in terms of full RB unit, the UE and/or the base station determines transmit power of the PUSCH. For example, $M_{PUSCH}$ may be defined by the following equation 6.

$$M_{PUSCH}(i) = \left\lceil M + \sum_{x=0}^{N-1} \frac{n_x}{12} \right\rceil \quad \text{(Equation 6)}$$

Herein, M is the number of scheduled full RBs, N is the number of scheduled fractional RBs, and $n_x$ is the number of subcarriers included in an xth scheduled fractional RB.

In equation 6, the bandwidth corresponding to scheduled frequency resources is rounded up in an RB unit. By this means, irrespective of whether the scheduled RB is the full RB or the fractional RB, it is possible to maintain the same transmit power.

Further, $M_{PUSCH}$ may be defined by the following equation 7.

$$M_{PUSCH}(i) = M + \sum_{x=0}^{N-1} \frac{n_x}{12} \quad \text{(Equation 7)}$$

In equation 7, the bandwidth corresponding to scheduled frequency resources is not rounded up in an RB unit, and is kept without any processing. By this means, irrespective of whether the scheduled RB is the full RB or the fractional RB, it is possible to maintain the same power density (PSD: Power Spectrum Density).

In addition, herein, transmit power of the uplink shared channel (PUSCH) is described, and similar control may be applied to other channels/signals. For example, in an uplink control channel (PUCCH: Physical Uplink Shared Channel), uplink reference signal (e.g., SRS: Sounding Reference Signal) and the like, by the similar principle, it is possible to control transmit power with the number of subcarriers included in the fractional RB considered.

According to Embodiment 8 as described above, even in the case where the fractional RB is scheduled, it is possible to properly control uplink transmit power.

Modification

Information on the processing for the fractional RB described in each Embodiment may be beforehand specified by specifications, or may be notified (configured, indicated) to the UE, by higher layer signaling (e.g., RRC signaling), physical layer signaling (e.g., DCI), other signals and/or combination thereof.

For example, the UE may be notified of the parameter with respect to (the region of) the fractional RB (Embodiment 1), the information on the resource mapping pattern of the RS for fractional RB (Embodiment 2), the information to identify the mapping method of data (Embodiment 3), the information on resources of downlink control channel candidates of the RS for fractional RB (Embodiment 5), the sequence length of the CAZAC sequence used in the fractional RB (Embodiment 7) and the like. Based on the notified information, the UE may perform control with respect to the fractional RB and/or full RB.

In addition, each Embodiment describes the fractional RB with the number of subcarriers less than "12", and the present invention may be applied to RBs of other configurations. For example, in the case of using an RB (e.g., which may be called a super RB) with the number of subcarriers higher than "12", the fractional RB in each Embodiment may be read with the super RB. Further, the constant of "12" in each Embodiment may be another value.

(Radio Communication System)

A configuration of a radio communication system according to one Embodiment of the present invention will be described below. In the radio communication system, communication is performed by using any of the radio communication methods according to above-mentioned each Embodiment of the invention or combination thereof.

Figure 10:
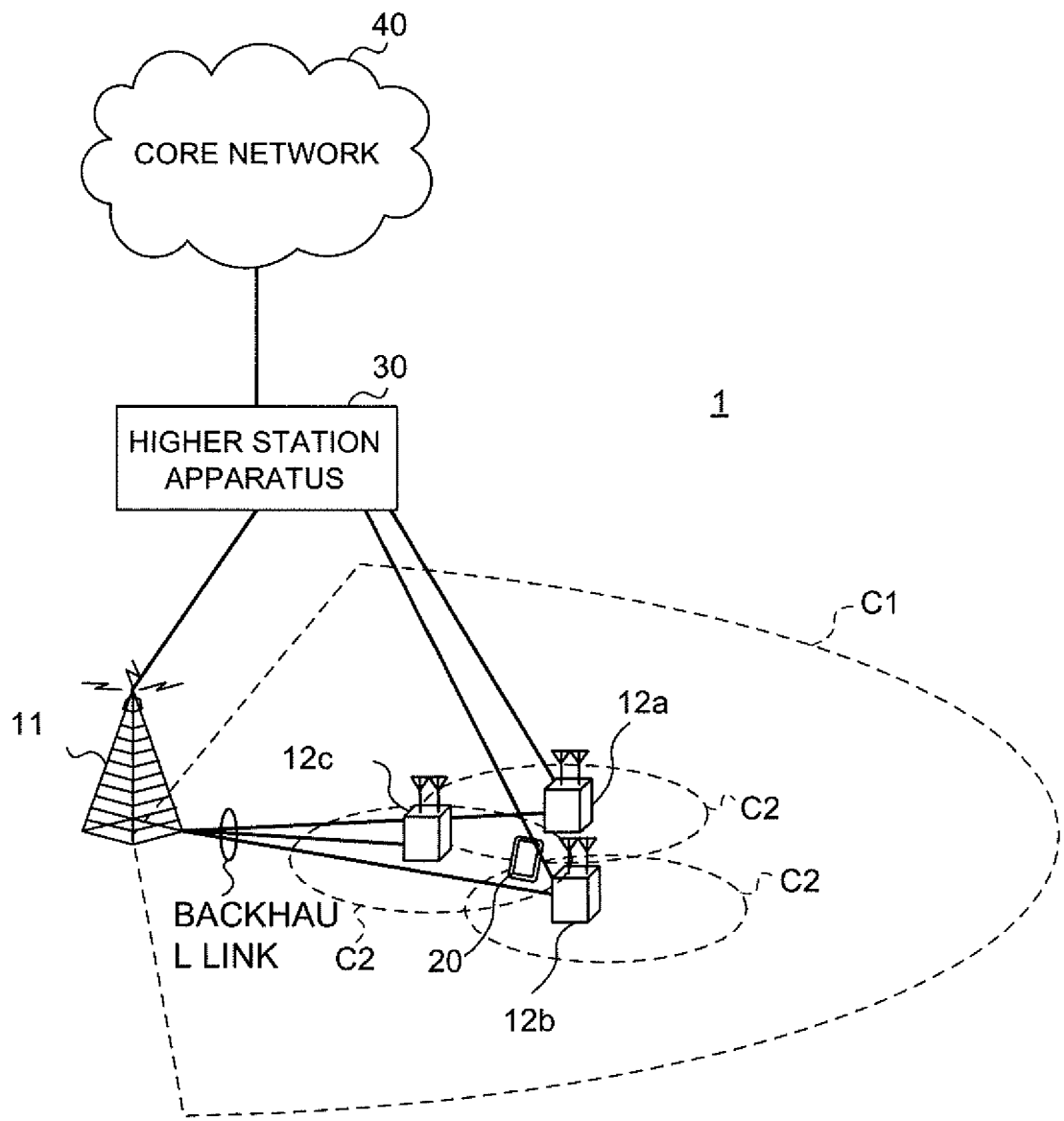
FIG. 10 is a diagram showing one example of a schematic configuration of a radio communication system according to one Embodiment of the present invention.

FIG. 10 is a diagram showing one example of a schematic configuration of the radio communication system according to one Embodiment of the present invention. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC).

In addition, the radio communication system 1 may be called LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology) and the like, or may be called the system to actualize each system described above.

The radio communication system 1 is provided with a radio base station 11 for forming a macrocell C1 with relatively wide coverage, and radio base stations 12 (12a to 12c) disposed inside the macrocell C1 to form small cells C2 narrower than the macrocell C1. Further, a user terminal 20 is disposed in the macrocell C1 and each of the small cells C2. The arrangement of each cell and user terminal 20 is not limited to the arrangement shown in the figure.

The user terminal 20 is capable of connecting to both the radio base station 11 and the radio base station 12. The user terminal 20 is assumed to concurrently use the macrocell C1 and small cell C2 using CA or DC. Further, the user terminal 20 may apply CA or DC using a plurality of cells (CCs) (e.g., 5 CCs or less, 6 CCs or more).

The user terminal 20 and radio base station 11 are capable of communicating with each other using carriers (also called the existing carrier, legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz, etc.), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g., optical fiber in conformity with CPRI (Common Public Radio Interface), X2 interface, etc.), or wireless connection.

The radio base station 11 and each of the radio base stations 12 are respectively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), transmission and reception point and the like. Further, the radio base station 12 is a radio base station having local coverage, and may be called a small base station, micro-base station, pico-base station, femto-base station, HeNB (Home eNodeB), RRH (Remote Radio Head), transmission and reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal (fixed station), as well as the mobile communication terminal (mobile station).

In the radio communication system 1, as radio access schemes, Orthogonal Frequency Division Multiple Access (OFDMA) is applied on downlink, and Single Carrier Frequency Division Multiple Access (SC-FDMA) is applied on uplink.

OFDMA is a multicarrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of one or contiguous resource blocks for each terminal so that a plurality of terminals uses mutually different bands, and thereby reducing interference among terminals. In addition, uplink and downlink radio access schemes are not limited to the combination of the schemes, and another radio access scheme may be used.

As downlink channels, in the radio communication system 1 are used a downlink shared channel (PDSCH: Physical Downlink Shared Channel) shared by user terminals 20, broadcast channel (PBCH: Physical Broadcast Channel), downlink L1/L2 control channels and the like. User data, higher layer control information, SIB (System Information Block) and the like are transmitted on the PDSCH. Further, MIB (Master Information Block) is transmitted on the PBCH.

The downlink L1/L2 control channel includes PDCCH (Physical Downlink Control Channel), EPDCCH (Enhanced Physical Downlink Control Channel), PCFICH (Physical Control Format Indicator Channel), PHICH (Physical Hybrid-ARQ Indicator Channel) and the like. The downlink control information (DCI) including scheduling information of the PDSCH and PUSCH and the like is transmitted on the PDCCH. The number of OFDM symbols used in the PDCCH is transmitted on the PCFICH. Receipt confirmation information (e.g., also referred to as retransmission control information, HARQ-ACK, ACK/NACK, etc.) of HARQ (Hybrid Automatic Repeat reQuest) for the PUSCH is transmitted on the PHICH. The EPDCCH is frequency division multiplexed with the PDSCH (downlink shared data channel) to be used in transmitting the DCI and the like as the PDCCH.

As uplink channels, in the radio communication system 1 are used an uplink shared channel (PUSCH: Physical Uplink Shared Channel) shared by user terminals 20, uplink control channel (PUCCH: Physical Uplink Control Channel), random access channel (PRACH: Physical Random Access Channel) and the like. User data, higher layer control information and the like is transmitted on the PUSCH. Further, radio quality information (CQI: Channel Quality Indicator) of downlink, receipt confirmation information and the like are transmitted on the PUCCH. A random access preamble to establish connection with the cell is transmitted on the PRACH.

As downlink reference signals, in the radio communication system 1 are transmitted Cell-specific Reference Signal (CRS), Channel State Information-Reference Signal (CSI-RS), Demodulation Reference Signal (DMRS: DeModulation Reference Signal), Positioning Reference Signal (PRS) and the like. Further, as uplink reference signals, in the radio communication system 1 are transmitted Sounding Reference Signal (SRS), Demodulation Reference Signal (DMRS) and the like. In addition, the DMRS may be called UE-specific Reference Signal. Further, the transmitted reference signals are not limited thereto.

(Radio Base Station)

Figure 11:
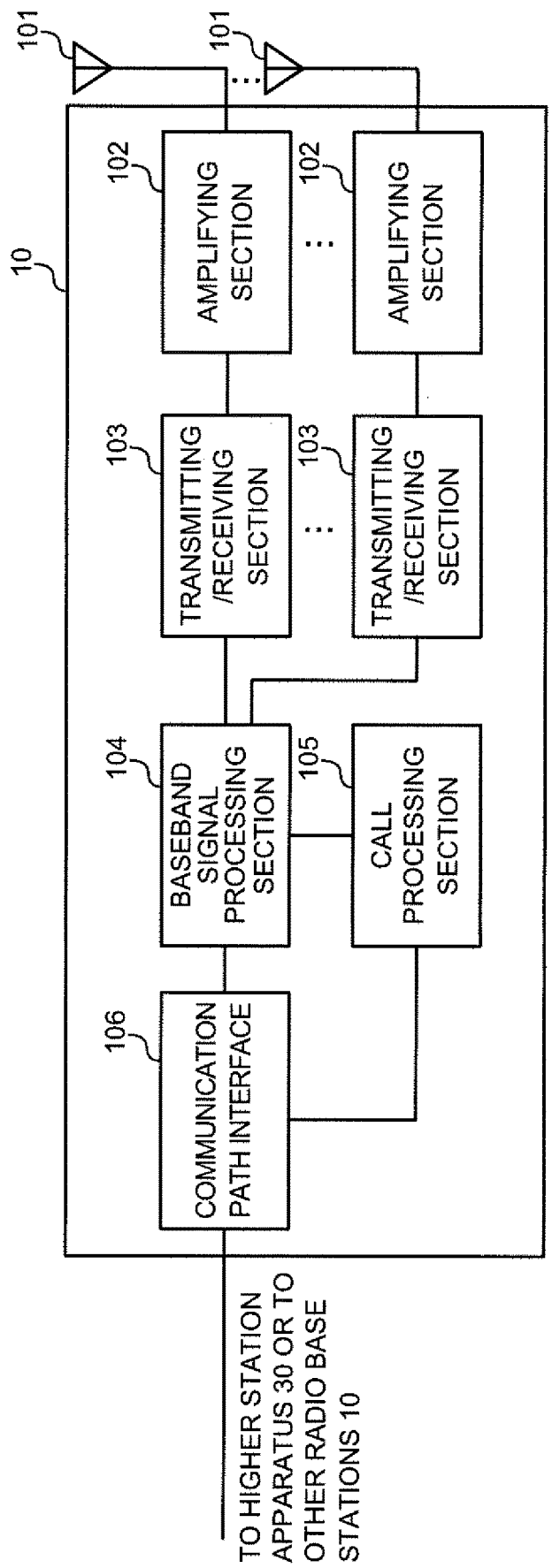
FIG. 11 is a diagram showing one example of an entire configuration of a radio base station according to one Embodiment of the invention.

FIG. 11 is a diagram showing one example of an entire configuration of the radio base station according to one Embodiment of the present invention. The radio base station 10 is provided with a plurality of transmitting/receiving antennas 101, amplifying sections 102, transmitting/receiving sections 103, baseband signal processing section 104, call processing section 105, and communication path interface 106. In addition, with respect to each of the transmitting/receiving antenna 101, amplifying section 102, and transmitting/receiving section 103, the radio base station may be configured to include at least one or more.

User data to transmit to the user terminal 20 from the radio base station 10 on downlink is input to the baseband signal processing section 104 from the higher station apparatus 30 via the communication path interface 106.

The baseband signal processing section 104 performs, on the user data, transmission processing such as processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., transmission processing of HARQ), scheduling, transmission format selection, channel coding, Inverse Fast Fourier Transform (IFFT) processing, and precoding processing to transfer to the transmitting/receiving sections 103. Further, also concerning a downlink control signal, the section 104 performs transmission processing such as channel coding and Inverse Fast Fourier Transform on the signal to transfer to the transmitting/receiving sections 103.

Each of the transmitting/receiving sections 103 converts the baseband signal, which is subjected to precoding for each antenna and is output from the baseband signal processing section 104, into a signal with a radio frequency band to transmit. The radio-frequency signal subjected to frequency conversion in the transmitting/receiving section 103 is amplified in the amplifying section 102, and is transmitted from the transmitting/receiving antenna 101. The transmitting/receiving section 103 is capable of being comprised of a transmitter/receiver, transmitting/receiving circuit or transmitting/receiving apparatus explained based on common recognition in the technical field according to the present invention. In addition, the transmitting/receiving section 103 may be comprised as an integrated transmitting/receiving section, or may be comprised of a transmitting section and receiving section.

On the other hand, for uplink signals, radio-frequency signals received in the transmitting/receiving antennas 101 are amplified in the amplifying sections 102. The transmitting/receiving section 103 receives the uplink signal amplified in the amplifying section 102. The transmitting/receiving section 103 performs frequency conversion on the received signal into a baseband signal to output to the baseband signal processing section 104.

For user data included in the input uplink signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the communication path interface 106. The call processing section 105 performs call processing (configuration, release and the like) of a communication channel, state management of the radio base station 10, management of radio resources and the like.

The communication path interface 106 transmits and receives signals to/from the higher station apparatus 30 via a predetermined interface. Further, the communication path interface 106 may transmit and receive signals (backhaul signaling) to/from another radio base station 10 via an inter-base station interface (e.g., optical fiber in conformity with CPRI (Common Public Radio Interface), X2 interface).

The transmitting/receiving section 103 may transmit information on a fractional RB (first resource unit) comprised of subcarriers lower in number than the predetermined number (e.g., "12"). The transmitting/receiving section 103 may transmit and/or receive a signal allocated to the fractional RB.

Figure 12:
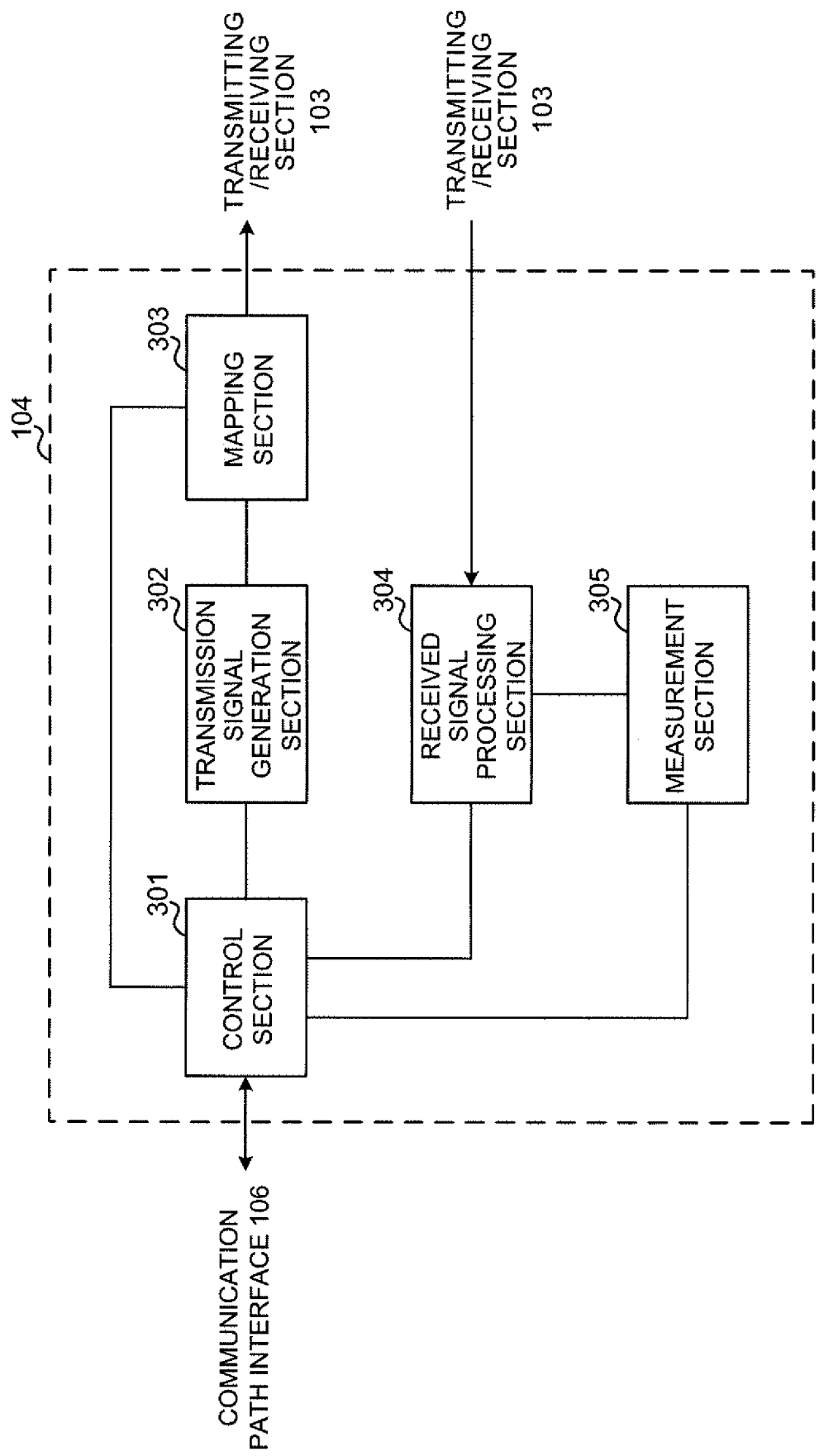
FIG. 12 is a diagram showing one example of a function configuration of the radio base station according to one Embodiment of the invention.

FIG. 12 is a diagram showing one example of a function configuration of the radio base station according to one Embodiment of the present invention. In addition, this example mainly illustrates function blocks of a characteristic portion in this Embodiment, and the radio base station 10 is assumed to have other function blocks required for radio communication.

The baseband signal processing section 104 is provided with at least a control section (scheduler) 301, transmission signal generating section 302, mapping section 303, received signal processing section 304, and measurement section 305. In addition, these components are essentially included in the radio base station 10, and a part or the whole of the components may not be included in the baseband signal processing section 104.

The control section (scheduler) 301 performs control of the entire radio base station 10. The control section 301 is capable of being comprised of a controller, control circuit or control apparatus explained based on the common recognition in the technical field according to the present invention.

For example, the control section 301 controls generation of signals by the transmission signal generating section 302, allocation of signals by the mapping section 303 and the like. Further, the control section 301 controls reception processing of signals by the received signal processing section 304, measurement of signals by the measurement section 305 and the like.

The control section 301 controls scheduling (e.g., resource allocation) of system information, downlink data signal (e.g., signal transmitted on the PDSCH), and downlink control signal (e.g., signal transmitted on the PDCCH and/or EPDCCH). Further, based on a result obtained by determining the necessity of retransmission control to an uplink data signal, and the like, the control section 301 controls generation of the downlink control signal (e.g., receipt confirmation signal, etc.), downlink data signal and the like. Furthermore, the control section 301 performs scheduling of synchronization signals (e.g., PSS (Primary Synchronization Signal)/SSS (Secondary Synchronization Signal)), downlink reference signals (e.g., CRS, CSI-RS, DMRS) and the like.

Further, the control section 301 controls scheduling of the uplink data signal (e.g., signal transmitted on the PUSCH), uplink control signal (e.g., signal transmitted on the PUCCH and/or PUSCH), random access preamble transmitted on the PRACH, uplink reference signal and the like.

The control section 301 may perform scheduling using the fractional RB (first resource unit) comprised of subcarriers lower in number than the predetermine number (e.g., "12"). Further, the control section 301 may perform control for transmitting the information on the fractional RB to the user terminal 20. The control section 301 may identify a frequency region of a full RB (second resource unit) comprised of the same number of subcarriers as the above-mentioned predetermined number, and control communication using the fractional RB inside the frequency region.

The control section 301 may perform control for mapping a reference signal used in the fractional RB according to a resource mapping rule different from a resource mapping rule for a reference signal used in the full RB. When data is scheduled in both the fractional RB and the full RB, the control section 301 may map the data to resources of the full RB with lower priority placed on resources of the fractional RB.

When data is scheduled in the fractional RB, based on the number of resources obtained by converting resources of scheduled fractional RBs into the full RB, the control section 301 may determine the transport block size and/or transmit power of the data.

The control section 301 may control not to transmit a downlink control channel in a region belonging to the fractional RB. The control section 301 may perform control, while assuming that communication using the fractional RB is limited to a predetermined radio access scheme on uplink. The control section 301 may use a sequence shorter or longer than a reference signal sequence for the full RB, as a reference signal sequence for the fractional RB.

Based on instructions from the control section 301, the transmission signal generating section 302 generates downlink signals (downlink control signal, downlink data signal, downlink reference signal, etc.) to output to the mapping section 303. The transmission signal generating section 302 is capable of being comprised of a signal generator, signal generating circuit or signal generating apparatus explained based on the common recognition in the technical field according to the present invention.

For example, based on instructions from the control section 301, the transmission signal generating section 302 generates DL assignment to notify of assignment information of downlink signals and UL grant to notify of assignment information of uplink signals. Further, the downlink data signal is subjected to coding processing and modulation processing, according to a coding rate, modulation scheme and the like determined based on the channel state information (CSI) from each user terminal 20 and the like.

Based on instructions from the control section 301, the mapping section 303 maps the downlink signal generated in the transmission signal generating section 302 to predetermined radio resources to output to the transmitting/receiving section 103. The mapping section 303 is capable of being comprised of a mapper, mapping circuit or mapping apparatus explained based on the common recognition in the technical field according to the present invention.

The received signal processing section 304 performs reception processing (e.g., demapping, demodulation, decoding, etc.) on the received signal input from the transmitting/receiving section 103. Herein, for example, the received signal is the uplink signal (uplink control signal, uplink data signal, uplink reference signal, etc.) transmitted from the user terminal 20. The received signal processing section 304 is capable of being comprised of a signal processor, signal processing circuit or signal processing apparatus explained based on the common recognition in the technical field according to the present invention.

The received signal processing section 304 outputs the information decoded by the reception processing to the control section 301. For example, in the case of receiving the PUCCH including HARQ-ACK, the section 304 outputs the HARQ-ACK to the control section 301. Further, the received signal processing section 304 outputs the received signal and/or signal subjected to the reception processing to the measurement section 305.

The measurement section 305 performs measurement on the received signal. The measurement section 305 is capable of being comprised of a measurement device, measurement circuit or measurement apparatus explained based on the common recognition in the technical field according to the present invention.

For example, based on the received signal, the measurement section 305 may perform RRM (Radio Resource Management) measurement, CSI (Channel State Information) measurement and the like. The measurement section 305 may measure received power (e.g., RSRP (Reference Signal Received Power)), received quality (e.g., RSRQ (Reference Signal Received Quality), SINR (Signal to Interference plus Noise Ratio)), power strength (e.g., RSSI (Received Signal Strength indicator)), uplink propagation path information (e.g., CSI) and the like. The measurement result may be output to the control section 301.

(User Terminal)

Figure 13:
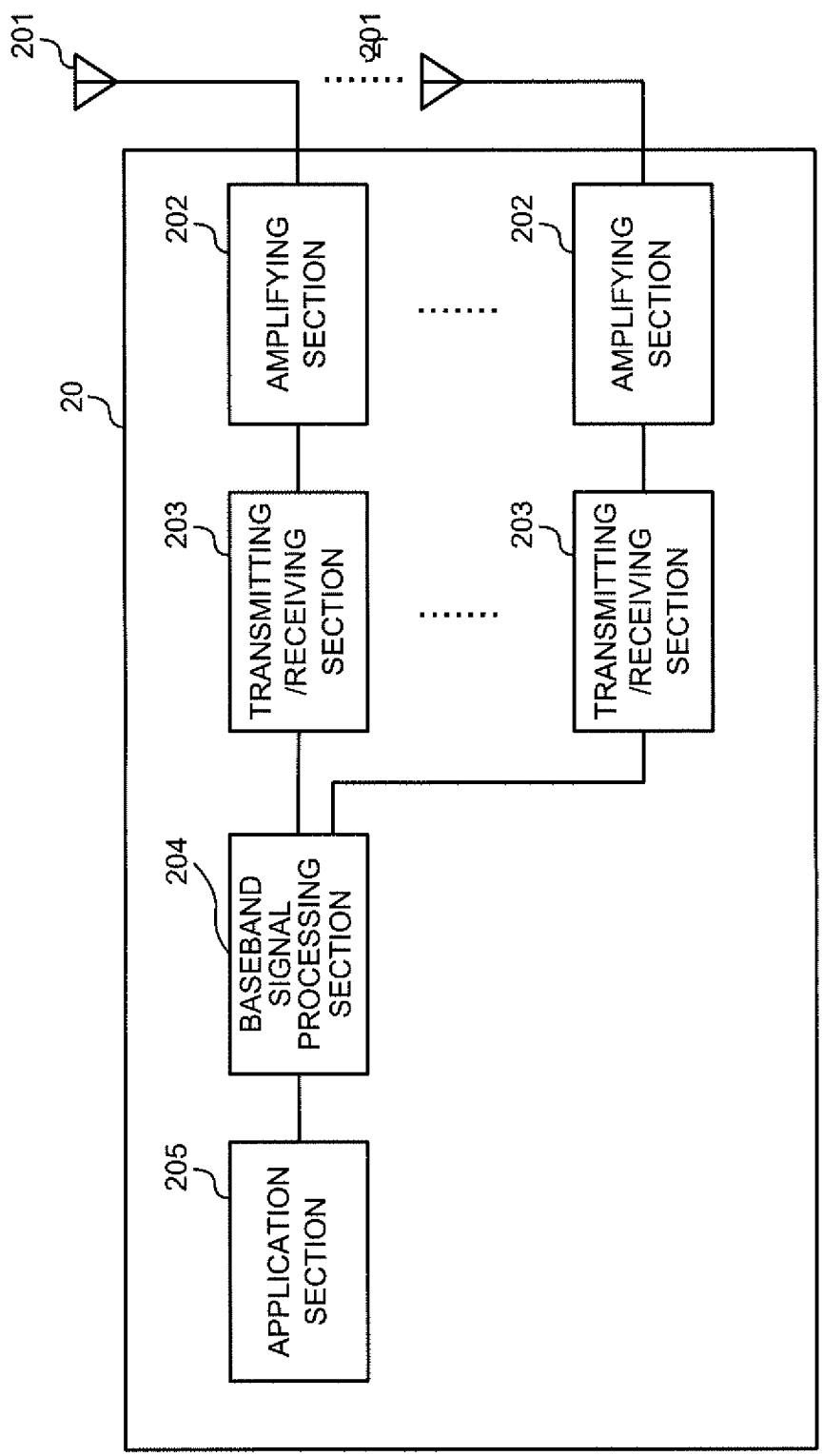
FIG. 13 is a diagram showing one example of an entire configuration of a user terminal according to one Embodiment of the invention.

FIG. 13 is a diagram showing one example of an entire configuration of the user terminal according to one Embodiment of the present invention. The user terminal 20 is provided with a plurality of transmitting/receiving antennas 201, amplifying sections 202, transmitting/receiving sections 203, baseband signal processing section 204, and application section 205. In addition, with respect to each of the transmitting/receiving antenna 201, amplifying section 202, and transmitting/receiving section 203, the user terminal may be configured to include at least one or more.

Radio-frequency signals received in the transmitting/receiving antennas 201 are respectively amplified in the amplifying sections 202. Each of the transmitting/receiving sections 203 receives the downlink signal amplified in the amplifying section 202. The transmitting/receiving section 203 performs frequency conversion on the received signal into a baseband signal to output to the baseband signal processing section 204. The transmitting/receiving section 203 is capable of being comprised of a transmitter/receiver, transmitting/receiving circuit or transmitting/receiving apparatus explained based on the common recognition in the technical field according to the present Invention. In addition, the transmitting/receiving section 203 may be comprised as an integrated transmitting/receiving section, or may be comprised of a transmitting section and receiving section.

The baseband signal processing section 204 performs FFT processing, error correcting decoding, reception processing of retransmission control and the like on the Input baseband signal. User data on downlink is transferred to the application section 205. The application section 205 performs processing concerning layers higher than the physical layer and MAC layer, and the like. Further, among the downlink data, broadcast information may also be transferred to the application section 205.

On the other hand, for user data on uplink, the data is input to the baseband signal processing section 204 from the application section 205. The baseband signal processing section 204 performs transmission processing of retransmission control (e.g., transmission processing of HARQ), channel coding, precoding, Discrete Fourier Transform (DFT) processing, IFFT processing and the like to transfer to each of the transmitting/receiving sections 203. Each of the transmitting/receiving sections 203 converts the baseband signal output from the baseband signal processing section 204 into a signal with a radio frequency band to transmit. The radio-frequency signals subjected to frequency conversion in the transmitting/receiving sections 203 are amplified in the amplifying sections 202, and are transmitted from the transmitting/receiving antennas 201, respectively.

The transmitting/receiving section 203 may receive the information on the fractional RB (first resource unit) comprised of subcarriers lower in number than the predetermine number (e.g., "12"). The transmitting/receiving section 203 may transmit and/or receive a signal allocated to the fractional RB.

Figure 14:
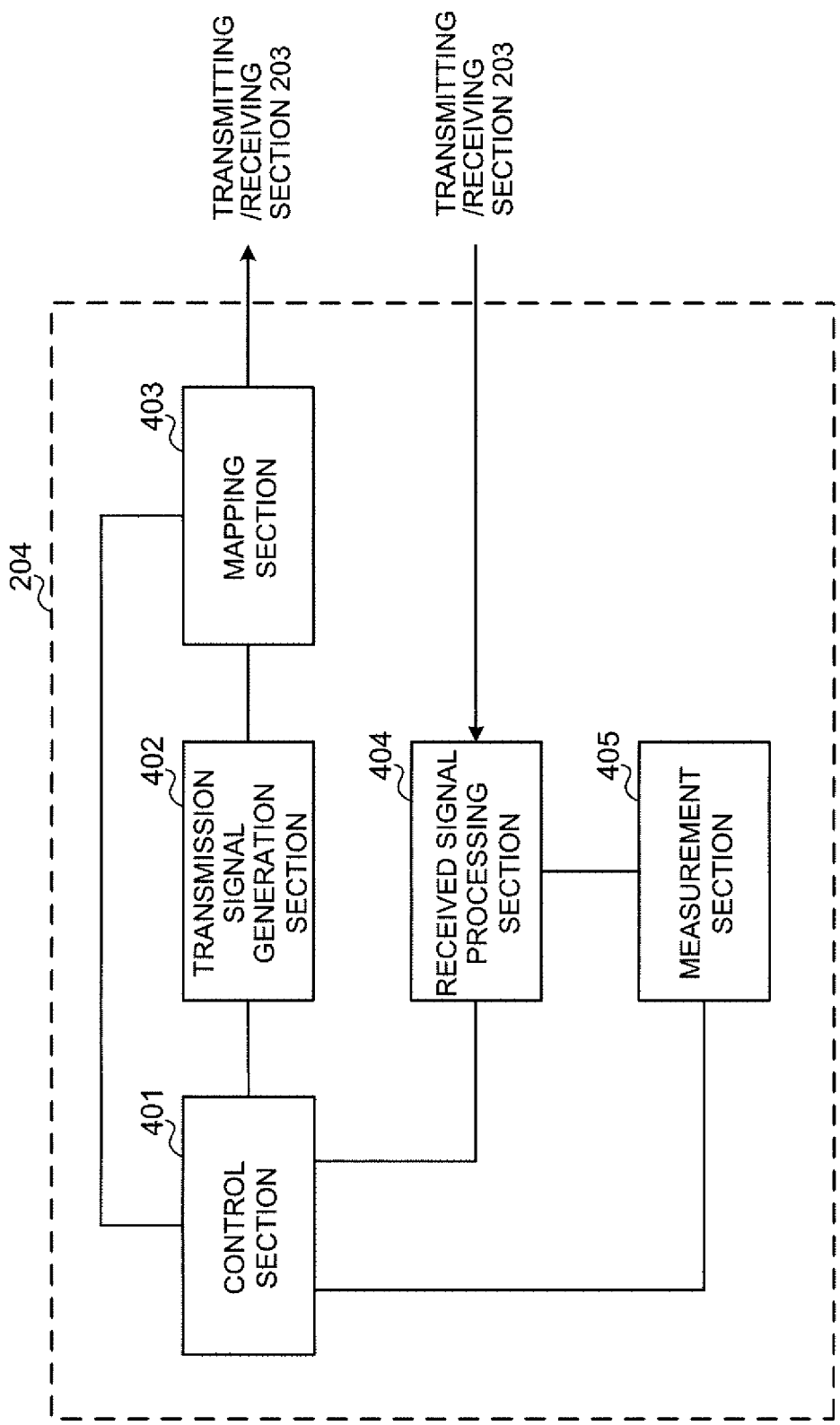
FIG. 14 is a diagram showing one example of a function configuration of the user terminal according to one Embodiment of the invention.

FIG. 14 is a diagram showing one example of a function configuration of the user terminal according to one Embodiment of the present invention. In addition, this example mainly illustrates function blocks of a characteristic portion in this Embodiment, and the user terminal 20 is assumed to have other function blocks required for radio communication.

The baseband signal processing section 204 that the user terminal 20 has is provided with at least a control section 401, transmission signal generating section 402, mapping section 403, received signal processing section 404, and measurement section 405. In addition, these components are essentially included in the user terminal 20, and a part or the whole of the components may not be included in the baseband signal processing section 204.

The control section 401 performs control of the entire user terminal 20. The control section 401 is capable of being comprised of a controller, control circuit or control apparatus explained based on the common recognition in the technical field according to the present invention.

For example, the control section 401 controls generation of signals by the transmission signal generating section 402, allocation of signals by the mapping section 403 and the like. Further, the control section 401 controls reception processing of signals by the received signal processing section 404, measurement of signals by the measurement section 405 and the like.

The control section 401 acquires the downlink control signal (e.g., signal transmitted on the PDCCH/EPDCCH) and downlink data signal (e.g., signal transmitted on the PDSCH) transmitted from the radio base station 10, from the received signal processing section 404. Based on the downlink control signal and/or a result obtained by determining the necessity of retransmission control to the downlink data signal, and the like, the control section 401 controls generation of the uplink control signal (e.g., receipt confirmation information, etc.) and/or uplink data signal.

Based on the information on the fractional RB (first resource unit) comprised of subcarriers lower in number than the predetermine number (e.g., "12"), the control section 401 identifies a frequency region of the full RB (second resource unit) comprised of the same number of subcarriers as the predetermined number, and controls communication using the fractional RB inside the frequency region. Herein, the subcarriers constituting the fractional RB may include discontiguous subcarriers.

The control section 401 may perform control for mapping a reference signal used in the fractional RB according to a resource mapping rule different from a resource mapping rule for a reference signal used in the full RB. When data is scheduled in both the fractional RB and the full RB, the control section 401 may map the data to resources of the full RB with lower priority placed on resources of the fractional RB.

When data is scheduled in the fractional RB, based on the number of resources obtained by converting resources of scheduled fractional RBs into the full RB, the control section 401 may determine the transport block size and/or transmit power of the data.

The control section 401 may control not to monitor downlink control channel candidates in a region belonging to the fractional RB. The control section 401 may perform control, while assuming that communication using the fractional RB is limited to a predetermined radio access scheme on uplink. The control section 401 may use a sequence shorter or longer than a reference signal sequence for the full RB, as a reference signal sequence for the fractional RB.

Further, in the case of acquiring various pieces of information notified from the radio base station 10, from the received signal processing section 404, the control section 401 may update a parameter used in control based on the information.

Based on instructions from the control section 401, the transmission signal generating section 402 generates uplink signals (uplink control signal, uplink data signal, uplink reference signal, etc.) to output to the mapping section 403. The transmission signal generating section 402 is capable of being comprised of a signal generator, signal generating circuit or signal generating apparatus explained based on the common recognition in the technical field according to the present invention.

For example, based on instructions from the control section 401, the transmission signal generating section 402 generates the uplink control signal about receipt confirmation information, channel state information (CSI) and the like. Further, based on instructions from the control section 401, the transmission signal generating section 402 generates the uplink data signal. For example, when the downlink control signal notified from the radio base station 10 includes the UL grant, the transmission signal generating section 402 is instructed to generate the uplink data signal from the control section 401.

Based on instructions from the control section 401, the mapping section 403 maps the uplink signal generated in the transmission signal generating section 402 to radio resources to output to the transmitting/receiving section 203. The mapping section 403 is capable of being comprised of a mapper, mapping circuit or mapping apparatus explained based on the common recognition in the technical field according to the present invention.

The received signal processing section 404 performs reception processing (e.g. demapping, demodulation, decoding, etc.) on the received signal input from the transmitting/receiving section 203. Herein, for example, the received signal is the downlink signal (downlink control signal, downlink data signal, downlink reference signal, etc.) transmitted from the radio base station 10. The received signal processing section 404 is capable of being comprised of a signal processor, signal processing circuit or signal processing apparatus explained based on the common recognition in the technical field according to the present invention. Further, the received signal processing section 404 is capable of constituting the receiving section according to the present invention.

The received signal processing section 404 outputs the information decoded by the reception processing to the control section 401. For example, the received signal processing section 404 outputs the broadcast information, system information, RRC signaling, DCI and the like to the control section 401. Further, the received signal processing section 404 outputs the received signal and/or signal subjected to the reception processing to the measurement section 405.

The measurement section 405 performs measurement on the received signal. For example, the measurement section 405 performs measurement using the downlink reference signal transmitted from the radio base station 10. The measurement section 405 is capable of being comprised of a measurement device, measurement circuit or measurement apparatus explained based on the common recognition in the technical field according to the present invention.

For example, based on the received signal, the measurement section 405 may perform RRM measurement, CSI measurement and the like. The measurement section 405 may measure received power (e.g., RSRP), received quality (e.g., RSRQ, SINR), power strength (e.g., RSSI), downlink propagation path information (e.g., CSI) and the like. The measurement result may be output to the control section 401.

(Hardware Configuration)

In addition, the block diagrams used in explanation of the above-mentioned Embodiments show blocks on a function-by-function basis. These function blocks (configuration sections) are actualized by any combination of hardware and/or software. Further, the means for actualizing each function block is not limited particularly. In other words, each function block may be actualized by a single apparatus combined physically and/or logically, or two or more apparatuses that are separated physically and/or logically are connected directly and/or indirectly (e.g., by cable and/or radio), and each function block may be actualized by a plurality of these apparatuses.

Figure 15:
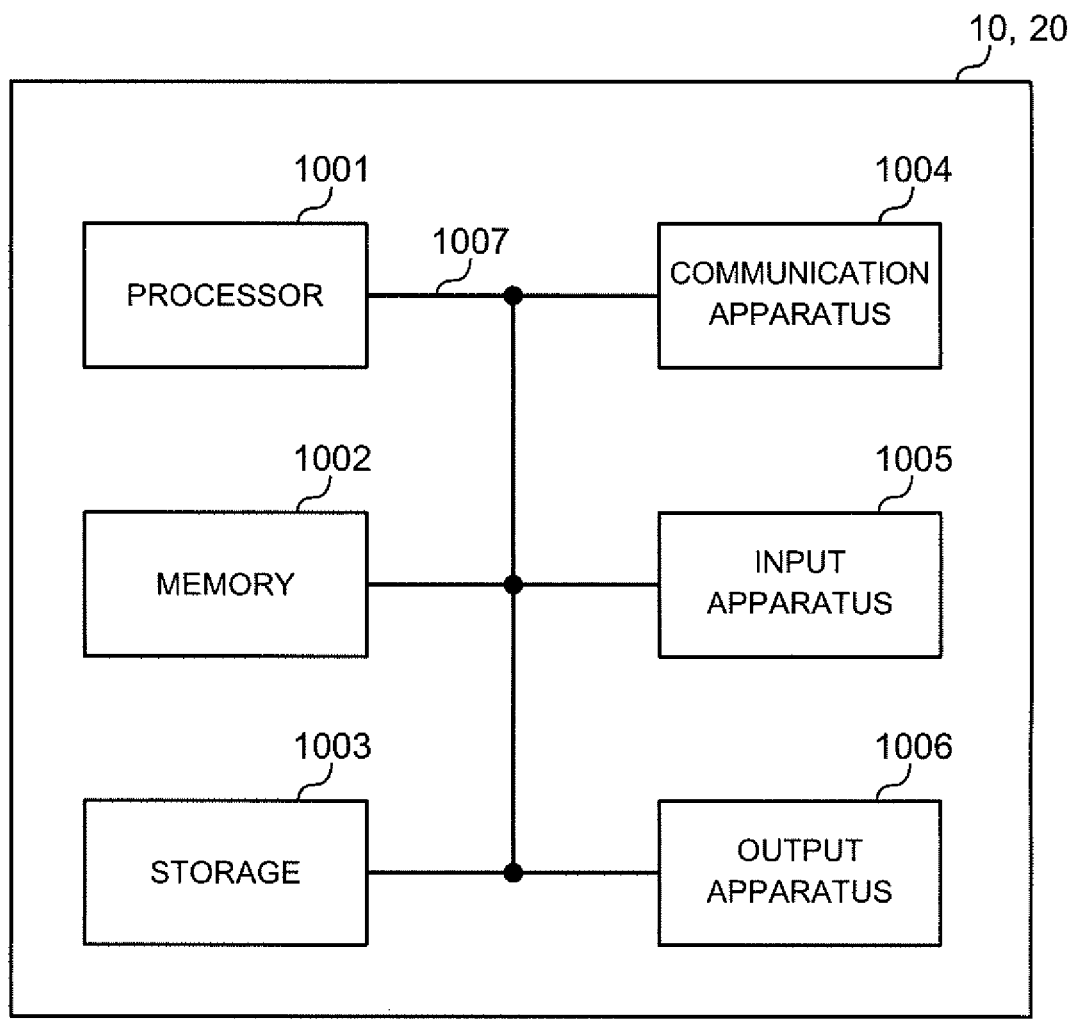
FIG. 15 is a diagram showing one example of hardware configurations of the radio base station and user terminal according to one Embodiment of the invention.

For example, each of the radio base station, user terminal and the like in one Embodiment of the present invention may function as a computer that performs the processing of the radio communication method of the invention. FIG. 15 is a diagram showing one example of a hardware configuration of each of the radio base station and user terminal according to one Embodiment of the invention. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by one or more processors at the same time, sequentially or by another technique. In addition, the processor 1001 may be implemented on one or more chips.

For example, each function in the radio base station 10 and user terminal 20 is actualized in a manner such that predetermined software (program) is read on the hardware of the processor 1001, memory 1002 and the like, and that the processor 1001 thereby performs computations, and controls communication by the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing section 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiments. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to one Embodiment of the present invention.

The storage 1003 is a computer-readable storage medium, and for example, may be comprised of at least one of a flexible disk, floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like. For example, the transmitting/receiving antenna 101 (201), amplifying section 102 (202), transmitting/receiving section 103 (203), communication path interface 106 and the like as described above may be actualized by the communication apparatus 1004.

The input apparatus 1005 is an input device (e.g., keyboard, mouse, microphone, switch, button, sensor, etc.) that receives input from the outside. The output apparatus 1006 is an output device (e.g., display, speaker, LED (Light Emitting Diode) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be comprised of a single bus, or may be comprised of different buses between apparatuses.

Furthermore, each of the radio base station 10 and user terminal 20 may be configured by including hardware such as a microprocessor, Digital Signal Processor (DSP), ASIC (Application Specific Integrated Circuit), PLD (Programmable Logic Device), and FPGA (Field Programmable Gate Array), or a part or the whole of each function block may be actualized by the hardware. For example, the processor 1001 may be implemented by at least one of the hardware.

Modification

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, a component carrier (CC) may be called a cell, frequency carrier, carrier frequency and the like.

Further, the radio frame may be comprised of one or a plurality of frames in the time domain. The one or each of the plurality of frames constituting the radio frame may be called a subframe. Furthermore, the subframe may be comprised of one or a plurality of slots in the time domain. The subframe may be a fixed time length (e.g., 1 ms) that is not dependent on numerology.

Furthermore, the slot may be comprised of one or a plurality of symbols (OFDM (Orthogonal Frequency Division Multiplexing) symbols, SC-FDMA (Single Carrier Frequency Division Multiple Access) symbols and the like) in the time domain. Still furthermore, the slot may be a time unit based on numerology. Moreover, the slot may include a plurality of mini-slots that may be a time unit based on numerology. Each mini-slot may be comprised of one or a plurality of symbols in the time domain.

Each of the radio frame, subframe, slot, mini-slot and symbol represents a time unit in transmitting a signal. For the radio frame, subframe, slot, mini-slot and symbol, another name corresponding to each of them may be used. For example, one subframe may be called Transmission Time Interval (TTI), a plurality of contiguous subframes may be called TTI, or one slot or one mini-slot may be called TTI. In other words, the subframe and/or TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini-slot and the like.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block and/or codeword, or may be a processing unit of scheduling, link adaptation and the like. In addition, when the TTI is given, a time segment (e.g., the number of symbols) to which the transport block, code block and/or codeword is actually mapped may be shorter than the TTI.

In addition, when one slot or one mini-slot is called the TTI, one or more TTIs (i.e., one or more slots, or one or more mini-slots) may be the minimum time unit of scheduling. Further, the number of slots (the number of mini-slots) constituting the minimum time unit of scheduling may be controlled.

The TTI having a time length of 1 ms may be called ordinary TTI (TTI in LTE Rel. 8-12), normal TTI, long TTI, ordinary subframe, normal subframe, long subframe or the like. The TTI shorter than the ordinary TTI may be called shortened TTI, short TTI, partial or fractional TTI, shortened subframe, short subframe or the like.

In addition, the long TTI (e.g., normal TTI, subframe, etc.) may be read with TTI having a time length exceeding 1 ms, and the short TTI (e.g., shortened TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. Further, the RB may include one or a plurality of symbols in the time domain, and may be a length of 1 slot, 1 mini-slot, 1 subframe, or 1 TTI. Each of 1 TTI and 1 subframe may be comprised of one or a plurality of resource blocks. In addition, one or a plurality of RBs may be called a physical resource block (PRB: Physical RB), subcarrier group (SCG: Sub-Carrier Group), Resource Element Group (REG), PRB pair, RB pair and the like.

Further, the resource block may be comprised of one or a plurality of resource elements (RE: Resource Element). For example, 1 RE may be a radio resource region of 1 subcarrier and 1 symbol.

In addition, structures of the above-mentioned radio frame, subframe, slot, mini-slot, symbol and the like are only illustrative. For example, it is possible to modify, in various manners, configurations of the number of subframes included in the radio frame, the number of slots per subframe or radio frame, the number of mini-slots included inside the slot, the numbers of symbols and RBs included in the slot or mini-slot, the number of subcarriers included in the RB, the number of symbols within the TTI, the symbol length, the cyclic prefix (CP) length and the like.

Further, the information, parameter and the like explained in the present Description may be expressed using an absolute value, may be expressed using a relative value from a predetermined value, or may be expressed using another corresponding information. For example, the radio resource may be indicated by a predetermined index. Furthermore, equations using these parameters and the like may be different from those explicitly disclosed in the present Description.

The names used in the parameter and the like in the present Description are not restrictive names in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive names in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed using a management table. The input/output information, signal and the like are capable of being rewritten, updated or edited. The output information, signal and the like may be deleted. The input information, signal and the like may be transmitted to another apparatus.

Notification of the information is not limited to the Aspect/Embodiments described in the present Description, and may be performed using another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, the physical layer signaling may be called L1/L2 (Layer 1/Layer 2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified using MAC Control Element (MAC CE).

Further, notification of predetermined information (e.g., notification of "being X") is not limited to notification that is performed explicitly, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middle-ware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "gNB", "cell", "sector", "cell group", "carrier" and "component carrier" are capable of being used interchangeably. There is the case where the base station is called by the terms of fixed station, NodeB, eNodeB (eNB), access point, transmission point, femto-cell, small cell and the like.

The base station is capable of accommodating one or a plurality of (e.g., three) cells (also called the sector). When the base station accommodates a plurality of cells, the entire coverage area of the base station is capable of being divided into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station sub-system that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by a person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, particular operation performed by the base station may be performed by an upper node thereof in some case. In a network comprised of one or a plurality of network nodes having the base station, it is obvious that various operations performed for communication with the terminal are capable of being performed by the base station, one or more network nodes (e.g., MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile communications), CDMA 2000, UMB (Ultra Mobile Broadband), IEEE 802.11 (WI-FI (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description do not limit the amount or order of these elements overall. These designations are capable of being used in the present Description as the useful method to distinguish between two or more elements. Accordingly, references of first and second elements do not mean that only two elements are capable of being adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g., search in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access". In the case of using in the present Description, it is possible to consider that two elements are mutually "connected" or "coupled", by using one or more electric wires, cable and/or print electric connection, and as some non-limited and non-inclusive examples, electromagnetic energy having wavelengths in a radio frequency region, microwave region and/or light (both visible and invisible) region, or the like.

In the present Description or the scope of the claims, in the case of using "including", "comprising" and modifications thereof, as in the term of "provided with", these terms are intended to be inclusive. Further, the term of "or" used in the present Description or the scope of the claims is intended to be not exclusive OR.

As described above, the present invention is described in detail, but it is obvious to a person skilled in the art that the invention is not limited to the Embodiments described in the present Description. The invention is capable of being carried into practice as modified and changed aspects without departing from the subject matter and scope of the invention defined by the descriptions of the scope of the claims. Accordingly, the descriptions of the present Description are intended for illustrative explanation, and do not have any restrictive meaning to the invention.

The disclosure of Japanese Patent Application No. 2016-212066, filed on Oct. 28, 2016, including the specification, drawings, and abstract, is incorporated herein by reference in its entirety.

The invention claimed is:

1. A terminal comprising:
a receiver that receives information related to a first resource unit that consists of subcarriers lower in number than a predetermined number; and
a processor which identifies a frequency region of a second resource unit comprised of a same number of subcarriers as the predetermined number based on the information, and controls communication using the first resource unit inside the frequency region,
wherein the processor uses a sequence shorter or longer than a reference signal sequence for the second resource unit, as a reference signal sequence for the first resource unit.

2. The terminal according to claim 1, wherein the subcarriers constituting the first resource unit include discontiguous subcarriers.

3. The terminal according to claim 1, wherein the processor performs control for mapping a reference signal used in the first resource unit according to a resource mapping rule different from a resource mapping rule for a reference signal used in the second resource unit.

4. The terminal according to claim 1, wherein when data is scheduled in both the first resource unit and the second resource unit, the processor maps data to resources of the second resource unit with lower priority placed on resources of the first resource unit.

5. The terminal according to claim 1, wherein when data is scheduled in the first resource unit, based on the number of resources obtained by converting resources of scheduled first resource units in terms of the second resource unit, the processor determines a transport block size and/or transmit power of the data.

6. The terminal according to claim 1, wherein the processor controls not to monitor downlink control channel candidates in a region belonging to the first resource unit.

7. The terminal according to claim 1, wherein the processor assumes that communication using the first resource unit is limited to a predetermined radio access scheme on uplink.

8. A radio communication method of a terminal, including:
receiving information related to a first resource unit that consists of subcarriers lower in number than a predetermined number;
identifying a frequency region of a second resource unit comprised of a same number of subcarriers as the predetermined number based on the information, and controlling communication using the first resource unit inside the frequency region; and
using a sequence shorter or longer than a reference signal sequence for the second resource unit, as a reference signal sequence for the first resource unit.

* * * * *